US012663289B2

(12) United States Patent
Murphy et al.

(10) Patent No.:  US 12,663,289 B2
(45) Date of Patent:  Jun. 23, 2026

(54) UTILIZING MODELS TO EVALUATE GEOLOCATION ESTIMATE QUALITY WITHOUT INDEPENDENT TEST DATA

(71) Applicant: VIAVI Solutions Inc., San Jose, CA (US)

(72) Inventors: Christopher Michael Murphy, Bath (GB); Dave Padfield, Marlborough (GB); Oliver Tyce, Wroughton (GB)

(73) Assignee: VIAVI Solutions Inc., Chandler, AZ (US)

( * ) Notice: Subject to any disclaimer, the term of this patent is extended or adjusted under 35 U.S.C. 154(b) by 218 days.

(21) Appl. No.: 17/649,698

(22) Filed: Feb. 2, 2022

(65) Prior Publication Data

US 2023/0243665 A1    Aug. 3, 2023

(51) Int. Cl.
*G01C 21/00*              (2006.01)

(52) U.S. Cl.
CPC ....... *G01C 21/3841* (2020.08); *G01C 21/005* (2013.01); *G01C 21/3848* (2020.08)

(58) Field of Classification Search
CPC .............. G01C 21/3841; G01C 21/005; G01C 21/3848; G01C 25/00
See application file for complete search history.

(56) References Cited

U.S. PATENT DOCUMENTS

| | | | | |
|---|---|---|---|---|
| 11,032,665 | B1* | 6/2021 | George | H04W 36/00835 |
| 11,068,786 | B1* | 7/2021 | Liu | G06N 3/045 |
| 2013/0143588 | A1* | 6/2013 | Flanagan | G01S 5/02521 |
| | | | | 455/456.1 |

| | | | | |
|---|---|---|---|---|
| 2015/0072714 | A1* | 3/2015 | Froehlich | H04W 4/023 |
| | | | | 455/457 |
| 2015/0094087 | A1* | 4/2015 | Chen | G01S 5/02524 |
| | | | | 455/456.1 |
| 2015/0173037 | A1* | 6/2015 | Pijl | A61B 5/1117 |
| | | | | 455/456.1 |
| 2015/0189528 | A1* | 7/2015 | Carbajal | H04B 17/318 |
| | | | | 370/252 |
| 2016/0021503 | A1* | 1/2016 | Tapia | H04W 24/02 |
| | | | | 455/456.1 |
| 2016/0139242 | A1* | 5/2016 | Dupray | G01S 1/026 |
| | | | | 455/456.1 |
| 2016/0328661 | A1* | 11/2016 | Reese | G06N 3/044 |
| 2016/0337804 | A1* | 11/2016 | Kim | H04W 4/33 |
| 2019/0156244 | A1* | 5/2019 | Faulhaber, Jr. | G06F 9/5072 |
| 2019/0286541 | A1* | 9/2019 | Sobala | G06F 11/3447 |
| 2021/0219099 | A1* | 7/2021 | Koteshwar Srinath | |
| | | | | G01S 5/0246 |

(Continued)

FOREIGN PATENT DOCUMENTS

WO          2020224761 A1    11/2020

OTHER PUBLICATIONS

Extended European Search Report for Application No. EP23154562, mailed on Jul. 7, 2023, 14 pages.

*Primary Examiner* — Faris S Almatrahi
*Assistant Examiner* — Moises Gasca Alva
(74) *Attorney, Agent, or Firm* — Harrity & Harrity, LLP

(57)          ABSTRACT

A device may receive a geolocation estimation model and geolocation input data identifying geolocations. The device may process one or more sets of the geolocation input data, with a quality evaluator model, to generate one or more quality evaluation metrics. The device may modify the geolocation estimation model based on the one or more quality evaluation metrics.

20 Claims, 10 Drawing Sheets

(56)        References Cited

U.S. PATENT DOCUMENTS

| 2022/0214186 | A1* | 7/2022 | Bagheri | G06F 18/253 |
| 2022/0262032 | A1* | 8/2022 | Gorban | G06V 10/774 |
| 2022/0400464 | A1* | 12/2022 | Bhorkar | H04W 64/00 |
| 2023/0059588 | A1* | 2/2023 | Zhao | H04W 4/40 |
| 2023/0179295 | A1* | 6/2023 | Duan | H04B 7/18543 |
| | | | | 455/427 |

* cited by examiner

100

110
Select a quality evaluator model

105
Receive a geolocation estimation model and geolocation input data

Geolocation system

Client device

Server device

115
Determine a set of the geolocation input data, for each of the one or more quality evaluator models, to generate sets of the geolocation input data Sets of geolocation input data Determine sets of input data Geolocation input data Geolocation system

100

125
Combine the quality evaluation metrics into one or more aggregate quality evaluation metrics Aggregate quality evaluation metrics Combine raw quality evaluation metrics Quality evaluation metrics Geolocation system

100

100

135
Perform one or more actions based on one or more quality evaluation metrics and/or one or more aggregate quality evaluation metrics

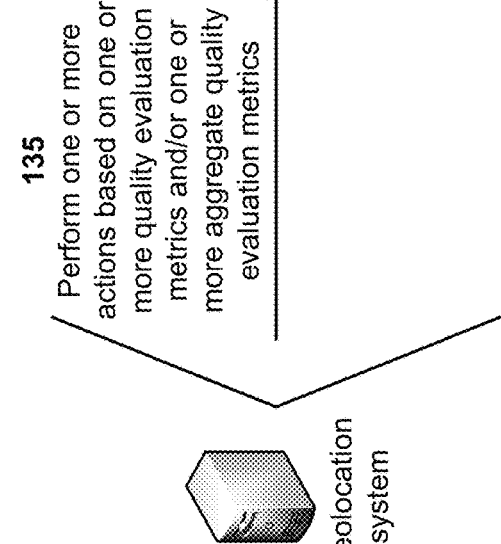

Geolocation system

Provide one or more quality evaluation metrics and/or one or more aggregate quality evaluation metrics for display Modify the geolocation estimation model based on one or more quality evaluation metrics and/or one or more aggregate quality evaluation metrics and cause the modified geolocation estimation model to be implemented Modify one or more parameters of the geolocation estimation model based on one or more quality evaluation metrics and/or one or more aggregate quality evaluation metrics Modify the one or more quality evaluator models based on one or more quality evaluation metrics and/or one or more aggregate quality evaluation metrics Receive feedback associated with one or more quality evaluation metrics and/or one or more aggregate quality evaluation metrics and modify the one or more quality evaluator models based on the feedback Retrain the one or more quality evaluator models based on one or more quality evaluation metrics and/or one or more aggregate quality evaluation metrics

FIG. 1F

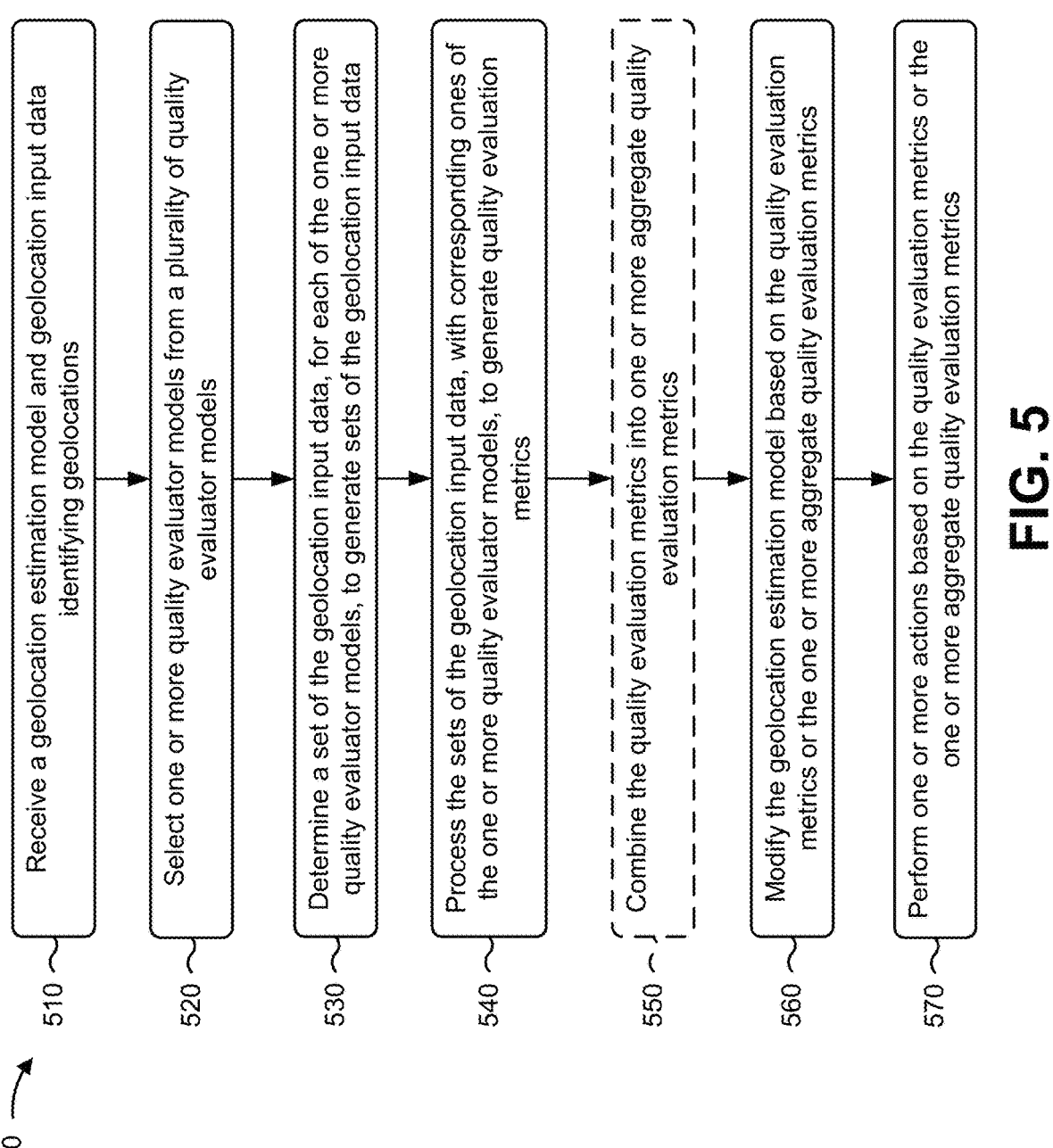

510 — Receive a geolocation estimation model and geolocation input data identifying geolocations 520 — Select one or more quality evaluator models from a plurality of quality evaluator models 530 — Determine a set of the geolocation input data, for each of the one or more quality evaluator models, to generate sets of the geolocation input data 540 — Process the sets of the geolocation input data, with corresponding ones of the one or more quality evaluator models, to generate quality evaluation metrics 550 — Combine the quality evaluation metrics into one or more aggregate quality evaluation metrics 560 — Modify the geolocation estimation model based on the quality evaluation metrics or the one or more aggregate quality evaluation metrics 570 — Perform one or more actions based on the quality evaluation metrics or the one or more aggregate quality evaluation metrics

UTILIZING MODELS TO EVALUATE GEOLOCATION ESTIMATE QUALITY WITHOUT INDEPENDENT TEST DATA

BACKGROUND

There are many applications that derive value from knowledge of locations and movements of individuals, vehicles, machines, and other entities. People often utilize knowledge of their current locations to navigate to destinations or to locate inspiring points of interest in their vicinity to which they might navigate. Some games employ estimates of the location of the players to create a more engaging gameplay. The emergence of virtual reality and augmented reality increases the scope for immersive games yet further. Where autonomous devices, machines, and vehicles have access to their location, they can negotiate complex environments and terrains to be more effective at reaching a destination, surveying an environment, or performing security patrols, for example.

Estimation of locations of people can reveal that the people are using specific transportation modes and routes such as roads, paths, cycle lanes, bus routes, and train routes. Combining this information for groups of people with the origins and destinations of their respective journeys facilitates the planning and optimization of integrated transportation services. Estimates of the geographical distribution, movements, trajectories, and/or the like of people can be compared to the normal or average geographical distribution, movements, trajectories, and/or the like and anomalies or deviations from the normal or average identified. The provision, configuration, timings, and/or the like of the transportation services can then be adjusted in response to the anomalies or deviations identified resulting in a transportation service that is optimized to the dynamic demands placed on it by its users. Estimation of the distribution of people in a venue, stadium or other facility can be used to identify places where density of people becomes or risks becoming dangerously high so that the crowds can be dissipated, leading to an improvement in pubic safety.

Where the locations of one or more sensors are estimated, then the geographical distributions of the physical quantities, events, phenomena, and/or the like measured by the sensors can be estimated. The estimates of the geographical distributions may be used to manage or optimize the management of a danger or provision of a service. For example, if the sensors measure a toxin, radiological hazard, excessive sound level, and/or the like, the locations where the levels of the toxin, radiological hazard, excessive sound level, and/or the like exceed or risk exceeding safe levels then damage mitigation can be performed or people redirected to improve health outcomes. In a further example, if the sensors measure the signals of a RF communication network, the locations where the signal level is poor or the interference is high can be identified and the RF communication network reconfigured to improve signal level and/or mitigate interference to provide a better service.

SUMMARY

In some implementations, a method may include receiving a geolocation estimation model, geolocation estimates generated by the geolocation estimation model, and geolocation input data identifying geolocations. The method may include determining a set of the geolocation input data, for each of one or more quality evaluator models, to generate sets of the geolocation input data, and processing the geolocation estimates generated by the geolocation estimation model along with sets of the geolocation input data, with corresponding ones of the one or more quality evaluator models, to generate one or more quality evaluation metrics. The method may include modifying the geolocation estimation model based on one or more of the one or more quality evaluation metrics.

In some implementations, a device includes one or more processors to receive a geolocation estimation model, geolocation estimates generated by the geolocation estimation model, and geolocation input data identifying geolocations, wherein the geolocation input data includes one or more of measurements associated with the geolocations, observations associated with the geolocations, or configuration values associated with the geolocations. The one or more processors may determine a set of the geolocation input data, for each of one or more quality evaluator models, to generate sets of the geolocation input data. The one or more processors may process the geolocation estimates generated by the geolocation estimation model along with sets of the geolocation input data, with corresponding ones of the one or more quality evaluator models, to generate one or more quality evaluation metrics. The one or more processors may modify the geolocation estimation model based on one or more of the one or more quality evaluation metrics.

In some implementations, a non-transitory computer-readable medium may store a set of instructions that includes one or more instructions that, when executed by one or more processors of a device, cause the device to receive a geolocation estimation model, geolocation estimates generated by the geolocation model, and geolocation input data identifying geolocations. The one or more instructions may cause the device to determine a set of the geolocation input data, for each of one or more quality evaluator models, to generate sets of the geolocation input data, and process the geolocation estimates generated by the geolocation estimation model along with sets of the geolocation input data, with corresponding ones of the one or more quality evaluator models, to generate one or more quality evaluation metrics. The one or more instructions may cause the device to modify the geolocation estimation model, or one or more parameters of the geolocation estimation model, based on one or more of the one or more quality evaluation metrics.

BRIEF DESCRIPTION OF THE DRAWINGS

FIGS. 1A-1F are diagrams of an example implementation described herein.

FIG. 5 is a flowchart of an example process for utilizing models to evaluate geolocation estimate quality without independent test data.

DETAILED DESCRIPTION

Figure 1A:
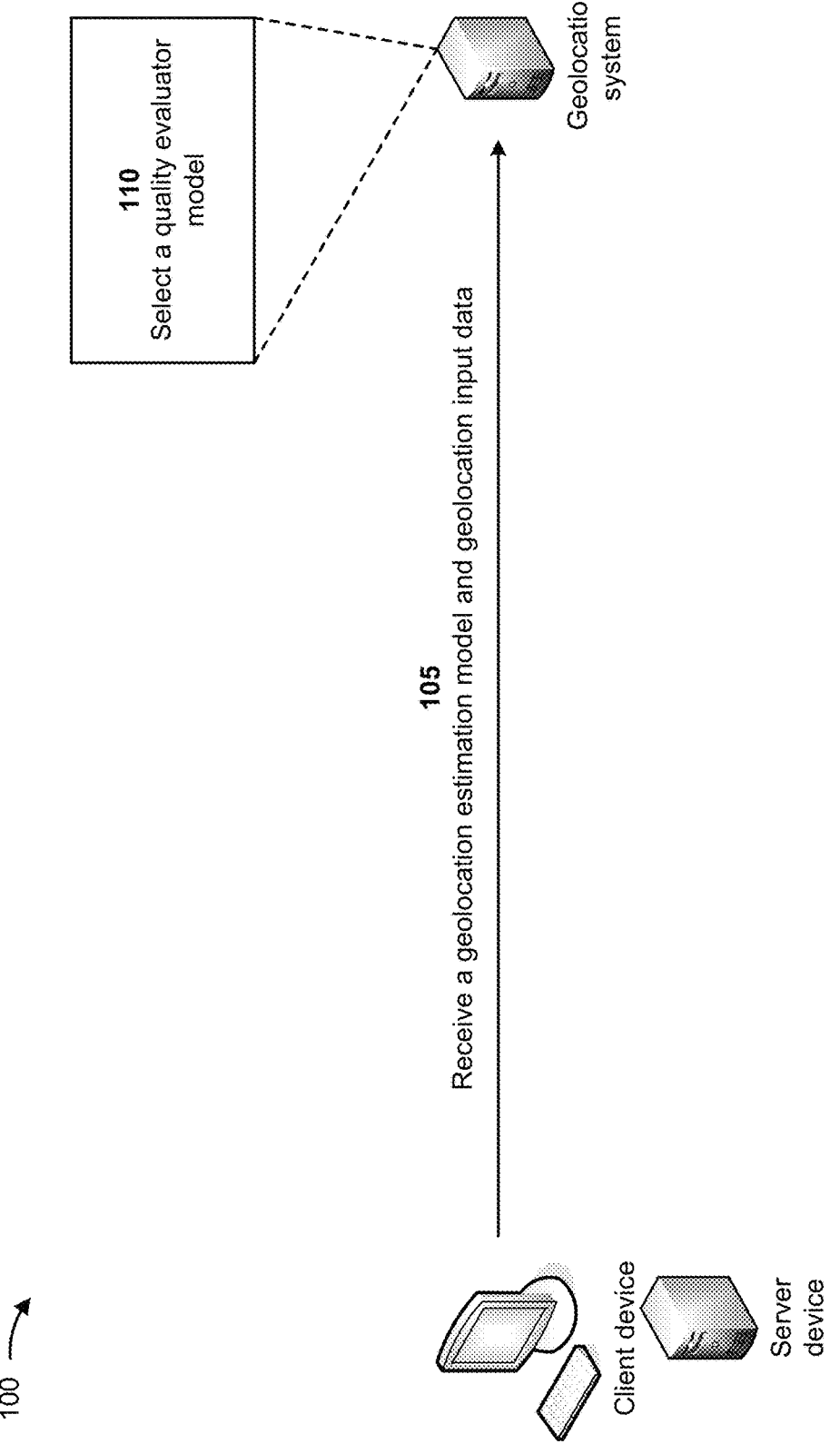

The following detailed description of example implementations refers to the accompanying drawings. The same reference numbers in different drawings may identify the same or similar elements.

Locations and trajectories may be measured for independent test data. The independent test data may be used to support various methods of creating, configuring, training, testing, refining, and maintaining a geolocation estimation model and to estimate accuracies of resulting geolocation estimates generated by the geolocation estimation model. For example, independent test data may be compared with geolocation estimates generated by a geolocation estimation model to determine an accuracy of the geolocation estimates and/or the geolocation estimation model. However, procuring representative samples of independent test data is typically costly and/or may be prevented from being used by owners of devices used to collect the independent test data, thereby causing independent test data to be prohibitive to procure in volumes sufficient to represent full spatial and temporal variation of a region where the geolocation estimation model is operating. Further, independent test data has inherent limitations in evaluation of the accuracy of geolocation estimates. For example, independent test data is susceptible to location and timestamp discrepancies. Thus, reliance on independent test data to drive geolocation estimation model enhancements to improve accuracies of geolocation estimates is limited.

Furthermore, there is a significant risk that many edge cases where a geolocation estimation fails will not be represented by the independent test data and thus cannot be detected or addressed by the geolocation system. A change to the geolocation estimation model to address a specific error in the geolocation estimates in one scenario may generally have poor effects in other scenarios. But these poor effects cannot be assessed without representative independent test data covering a full extent of a network for which geolocation estimation is required.

Additionally, a geolocation estimation algorithm typically includes hundreds of parameters that control the operation of the geolocation estimation model. For example, the parameters may control the degree of influence of each type of heterogeneous geolocation input data on the resulting geolocation estimates, the models for signal attenuation that underpin the propagation models, and/or how the consecutive geolocation estimates for a given entity are smoothed. Finding the optimal combination of values for these parameters that yields an algorithm that achieves sufficient accuracy of geolocation estimates across a network is a highly multi-dimensional problem which will typically defy the intuition of a software engineer or other specialist to solve.

Finally, an overall accuracy profile of the geolocation estimation model cannot be measured and large errors that result from failure by the geolocation estimation model risk being identified by users of the geolocation estimates rather than the engineers or entities building the geolocation estimation model. Therefore, current techniques for creating, configuring, training, testing, refining, and maintaining a geolocation estimation model waste computing resources (e.g., processing resources, memory resources, communication resources, and/or the like), networking resources, human resources, and/or the like associated with generating an inaccurate geolocation estimation model, generating inaccurate geolocation estimates with the inaccurate geolocation estimation model, providing the inaccurate geolocation estimates to applications, dealing with the consequences of the erroneous outputs of the applications resulting from inaccurate geolocation estimates used as inputs to the applications, handling customer complaints associated with the applications, and/or the like.

Some implementations described herein relate to a geolocation system that utilizes models to evaluate geolocation estimate quality of the geolocation estimates generated by a geolocation estimation model without independent test data. For example, the geolocation system may receive a geolocation estimation model, geolocation input data identifying geolocations, and geolocation estimates generated by the geolocation estimation model based on some or all of the geolocation input data. The geolocation system may select one or more quality evaluator models from a plurality of quality evaluator models based on receiving the geolocation estimation model and the geolocation input data. The geolocation system may determine a set of the geolocation input data, for each of the one or more quality evaluator models, to generate sets of the geolocation input data. The geolocation system may determine a set of the geolocation estimates, for each of the one or more quality evaluator models, to generate sets of the geolocation estimates. The geolocation system may process the sets of the geolocation input data and the sets of the geolocation estimates, with corresponding ones of the one or more quality evaluator models, to generate one or more quality evaluation metrics. The one or more quality evaluation metrics may include one or more raw quality aggregation metrics and/or one or more aggregate quality evaluation metrics. A raw quality aggregation metric may include a quality aggregation metric that is generated by a quality evaluator model based on processing a set of geolocation input data and a set of geolocation estimates. An aggregate quality metric may include a quality metric that is generated based on combining multiplicities of raw quality aggregation metrics into one or more aggregate quality metrics.

The one or more quality evaluation metrics (e.g., one or more raw quality evaluation metrics and/or one or more aggregate quality evaluation metrics) may indicate a quality of the geolocation estimates generated by the geolocation estimation model. For example, the one or more quality evaluation metrics may indicate a degree to which one or more geolocation estimates and/or one or more sequences of geolocation estimates have consistency with one or more other geolocation estimates and/or one or more other sequences of geolocation estimates, consistency with the geolocation input data used as inputs to the geolocation estimation model that produced the geolocation estimates, and/or consistency with other associated data. Additionally, the one or more quality evaluation metrics may indicate a plausibility of the one or more geolocation estimates and/or one or more sequences of geolocation estimates. The one or more quality evaluation metrics may also indicate a degree to which the distributions (e.g., spatial distributions and/or temporal distributions, among other examples) of geolocation estimates are visually convincing. Where the geolocation estimates are more consistent, more plausible, and/or more visually convincing, the quality evaluator model may generate a more favorable raw quality evaluation metric. Where the geolocation estimates are less consistent, less plausible, less visually convincing, or some combination, the quality evaluator model may generate a less favorable raw quality evaluation metric. The geolocation system may modify the geolocation estimation model based on the geolocation estimate quality of the geolocation estimation model (e.g., based on the one or more quality evaluation metrics).

In this way, the geolocation system utilizes models to evaluate geolocation estimate quality of the geolocation estimates generated by a geolocation estimation model without independent test data. The geolocation system may select quality evaluator models and may select geolocation input data for each of the quality evaluator models. The geolocation system may process the geolocation input data and geolocation estimates generated by the geolocation estimation model, with the quality evaluator models, to generate raw quality evaluation metrics and/or aggregate quality evaluation metrics, and may utilize the generated quality evaluation metrics to modify a geolocation estimation model, parameters of the geolocation estimation model, or both the geolocation estimation model and the parameters. This, in turn, conserves computing resources, networking resources, human resources, and/or the like that would otherwise have been wasted in generating an inaccurate geolocation estimation model, generating inaccurate geolocation estimates with the inaccurate geolocation estimation model, providing the inaccurate geolocation estimates to applications, dealing with the consequences of the erroneous outputs of the applications resulting from inaccurate geolocation estimates used as inputs to the applications, handling customer complaints associated with the applications, and/or the like.

FIGS. 1A-1F are diagrams of an example 100 associated with utilizing models to evaluate geolocation estimate quality without independent test data. As shown in FIGS. 1A-1F, example 100 includes a user device, a server device, and a geolocation system. The user device may include a laptop computer, a mobile telephone, a desktop computer, and/or the like associated with a user. The server device may include an application server, a client server, a web server, a database server, and/or the like. The geolocation system may include a system that utilizes models to evaluate geolocation estimate quality without independent test data.

As described herein, the geolocation system may receive geolocation input data that include hundreds, thousands, millions, and/or the like of data points received from hundreds, thousands, millions, and/or like of client devices and/or server devices, which may present a "big data" problem to the geolocation system. The geolocation system may process the geolocation input data with geolocation estimates generated by a geolocation estimation model, with one or more models, to identify one or more actions to perform, which improves a geolocation estimation model. The geolocation system may automatically cause the one or more actions to be performed in order to improve the geolocation estimation model.

As shown in FIG. 1A, and by reference number 105, the geolocation system receives a geolocation estimation model and geolocation input data. The geolocation estimation model may include a geolocation estimation function configured to determine a geolocation estimate (e.g., an estimation of a location of an entity) based on geolocation input data associated with the geolocation. In some implementations, the geolocation estimate may include information identifying a geographic location of an entity, such as a latitude and a longitude, a GPS coordinate, and/or the like. Alternatively, and/or additionally, the geolocation estimate may include information identifying a state and/or a class associated with the location of an entity, such as outdoors, indoors, pedestrian, vehicular, and/or the like.

In some implementations, the geolocation estimation model is received from another device (e.g., the client device, the server device, and/or the like). For example, the geolocation system may receive information identifying the geolocation estimation model, information identifying a location at which the geolocation estimation model is stored, and/or information indicating that the geolocation system is to evaluate geolocation estimate quality associated with the geolocation estimation model based on a user inputting the information via a user interface associated with the geolocation system. The geolocation system may obtain the geolocation estimation model based on receiving the input information.

The geolocation system may receive the geolocation input data periodically (e.g., daily, weekly, monthly, and/or the like), as data become available (e.g. streamed to the geolocation system when or after the geolocation input data are generated), based on an occurrence of an event (e.g., based on receiving the geolocation estimation model), based on providing a request to another device (e.g., the client device and/or the server device), and/or the like. The geolocation input data may include measurements associated with a plurality of geolocations, observations associated with the plurality of geolocations, configuration values associated with the plurality of geolocations, and/or the like. For example, the geolocation input data may include a set of measurements associated with a geolocation included in the plurality of geolocations.

The set of measurements may include one or more measured quantities. In some implementations, the one or more measured quantities may include one or more measures of the reception of electromagnetic energy. For example, the one or more measured quantities may include a signal strength, a signal quality, a signal-to-noise ratio, a channel quality indicator, a reference signal received power (RSRP), a reference signal code power (RSCP), a received power level (RxLev), a reference signal received quality (RSRQ), an Ec/No measurement, a received signal strength indicator (RSSI), a signal-to-interference-plus-noise ratio (SINR), a frequency, a center frequency, a spectral power distribution, a phase, a phase shift, an angle of arrival, a time of signal arrival, a time difference of arrival with respect to another signal, and/or the like. The electromagnetic energy may be associated with a communication system, such as a Global System for Mobile Communications (GSM) network, a Universal Mobile Telecommunications System (UNITS) network, a Long Term Evolution (LTE), a 5G New Radio (5G NR), a local area network (LAN), a wide area network (WAN), and/or the like. Alternatively, and/or additionally, the electromagnetic energy may be associated with a radio broadcast transmission, a beacon, a positioning system, and/or the like. In some implementations, the electromagnetic energy may be associated with unauthorized transmissions, unintentional interference, malicious interference, and/or natural transmissions.

In some implementations, the one or more measured quantities may include one or more messages and/or a sequence of messages. The one or more messages and/or the sequence of messages may be associated with a protocol stack layer. For example, the one or more messages and/or the sequence of messages may be associated with a physical layer, a media access control (MAC) layer, a logical link control (LLC) layer, a radio link control (RLC) layer, a packet data convergence protocol (PDCP) layer, a radio resource control (RRC) layer, an Internet Protocol (IP) layer, a transmission control protocol (TCP) layer, a user datagram protocol (UDP) layer, a data link layer, a network layer, a transport layer, a session, a presentation layer, an application layer, a communication stack for a specific application, and/or the like. Each of the one or more messages and/or the sequence of messages may be represented in an encoded form. For example, each of the one or more messages and/or the sequence of messages may be represented in abstract syntax notation (ASN.1), binary encoded form, encrypted form, plain text form, an indication that the message was present without including the contents, and/or the like.

In some implementations, the one or more measured quantities include one or more characteristics associated with establishing and/or maintaining a wireless communication link. For example, the one or more measured quantities may include a timing advance, a round trip signal propagation delay, a channel state, a channel rank, phase or amplitude pre-coding weights, a pre-coding matrix dictionary index, a modulation scheme, a coding scheme, a utilized carrier identity, a utilized subcarrier identity, a utilized bandwidth part identity, a utilized resource element identity, a measured carrier identity, a measured subcarrier identity, a measured bandwidth part identity, a serving cell identity, a serving sector identity, a serving beam identity, a measured cell identity, a measured sector identity, a measured beam identity, a transmission power, an angle of departure, a retransmission rate, a retransmission count, a data throughput volume, a data throughput rate, and/or the like.

In some implementations, the one or more measured quantities may include data associated with a sensor. For example, the one or more measured quantities may include sound, a sound pitch, a noise intensity, an ionizing radiation intensity, a particle count, a barometric pressure, a fluid pressure, a fluid flow rate, a temperature, a humidity, a chemical concentration, a vibration intensity, a magnetic field flux, a velocity, an acceleration, a weight, a mass, a n electrical voltage, an electrical current, an electrostatic charge, and/or the like.

An observation may include information and/or data actively acquired from a primary source and/or data can be subsequently analyzed and/or interpreted (e.g., by the geolocation system). In some implementations, the one or more observations may include an image and/or video. In some implementations, the one or more observations may include a representation of a return from a remote sensing system. For example, the one or more observations may include a return from a laser ranger, a Radio Detection and Ranging (RADAR) system, a Light Detection and Ranging (LiDAR) system, a sonar system, a scatterometer, a sounder, and/or the like.

In some implementations, a measurement of a measured quantity and/or an observation may be performed by a entity associated with the measured quantity. For example, a measurement of a measured quantity and/or an observation may be performed by a first entity and/or a second entity (described below), and/or a system collocated with the first entity and/or the second entity. Alternatively, and/or additionally, an independent entity not collocated with the first entity and/or the second entity may perform a measurement and/or an observation of the first entity and/or the second entity. In some implementations, the independent entity may include a base station, a communication device, a receiver of electromagnetic energy, a microphone, a Geiger counter, a particle counter, a chemical concentration meter, a vibrometer, a magnetic field sensor, a camera, a laser ranger, radar, LiDAR, sonar, a scatterometer, and/or sounder, among other examples.

A configuration value may include information and/or data that enables a device (e.g., the geolocation system) to interpret one or more measured quantities and/or to generate an inference regarding a location of an entity. For example, the one or more configuration values may include a location and/or a height of a fixed transmitter and/or receiver, an orientation of a transmitter and/or a receiver, a transmitter signal gain profile, a radiated power, a transmission frequency, a transmission frequency range, an antenna array configuration, an antenna array element arrangement and/or spacing, a location of a sensor, an orientation of a sensor, a configuration of a sensor, a sensitivity of a sensor, a configuration of a communication protocol, an identity allowing correlation between one or more physical and/or one or more logical entities, and/or the like.

In some implementations, each instance of geolocation input data (e.g., measured quantities, observations and/or configuration values) may be augmented with one or more supplemental values to aid interpretation. A supplemental value may include a time at which a measured quantity is measured and/or the measured quantity is obtained, a time at which an observation is made, a time period during which a measured quantity is measured and/or the measured quantity is obtained, a time period during which an observation is made, a time period during which a configuration value is applicable, a granularity of an instance of geolocation input data, a precision of an instance of geolocation input data, an accuracy of an instance of geolocation input data, a statistical function used to compute an instance of geolocation input data (e.g. mean, median, mode, max, min, percentile, and/or the like), an identity of an entity performing a measurement or observation, an identity of an entity to which a measured quantity or observation relates, an identity of the entity to which a configuration value relates, a timezone in which a supplemental value is expressed, a reference frame in which a supplemental value is expressed, and/or the like. In these implementations, each supplemental value is considered to be part of the geolocation input data (e.g., measured quantity, observation, and/or configuration values) to which the supplemental value relates.

As shown by reference number 110, the geolocation system selects a quality evaluator model. In some implementations, the geolocation system may be associated with a plurality of quality evaluator models and the geolocation system may select one or more quality evaluator models from a plurality of quality evaluator models. The quality evaluator model (or each of the plurality of quality evaluator models) may generate a quality evaluation metric (e.g., a raw quality evaluation metric) based on one or more geolocation estimates generated by the geolocation estimation model and the geolocation input data used to generate the one or more geolocation estimates. The quality evaluation metric may indicate a geolocation estimate quality of the geolocation estimation model. For example, the quality evaluation metric may indicate a degree to which one or more geolocation estimates and/or one or more sequences of geolocation estimates generated by the geolocation estimation model have consistency with one or more other geolocation estimates and/or one or more sequences of geolocation estimates, consistency with the geolocation input data used as inputs to the quality evaluator model, and/or consistency with other associated data. Additionally, the quality evaluation metric may indicate a plausibility of the one or more geolocation estimates and/or sequences of geolocation estimates. The quality evaluation metric may also indicate a degree to which distributions of geolocation estimates are visually convincing. Where the geolocation estimates are more consistent, more plausible, and/or more visually convincing, the quality evaluator model may generate a more favorable quality evaluation metric. Where the geolocation estimates are less consistent, less plausible, less visually convincing, or some combination, the quality evaluator model may generate a less favorable quality evaluation metric.

The quality evaluation metric may comprise various forms including quantitative, ordinal, categorical, qualitative, and/or the like. In some implementations, the quality evaluation metric may be numerical. In these implementations, larger numerical values may be more favorable and/or may be associated with geolocation estimates that are more consistent, more plausible and/or more visually convincing. In other implementations, different relationships between the magnitude of the numerical values may indicate the consistency of the geolocation estimates, the plausibility of the geolocation estimates, and/or the degree to which the geolocation estimates are visually convincing.

A geolocation estimate may be expressed as a position on the surface of the Earth (e.g., a longitude and a latitude in some geocentric coordinates). In some implementations, a geolocation estimate may be expressed as a position in relation to the surface of the Earth, such as a longitude and a latitude in some geocentric coordinates and a measure of elevation or depth. In some implementations, reference frames other than geocentric may be used to express geolocation estimates in two or more dimensions, such as a Cartesian reference frame, geodetic datum, a spatial reference system, a polar system centred on an entity other than the Earth, and/or the like.

The quality evaluator model (or the plurality of quality evaluator models) may include one or more quality evaluator functions. In some implementations, a quality evaluator model includes one or more quality evaluator functions included in one or more other quality evaluator models. Alternatively, and/or additionally, a quality evaluator model includes one or more quality evaluator functions that are not included in any other quality evaluator model.

In some implementations, the one or more quality evaluator functions include a first quality evaluator function. The first quality evaluator function may generate a raw quality evaluation metric based on comparing geolocation estimates, measurements, observations, and/or configurations relating to a first entity and a second entity. For example, the first quality evaluator function may calculate a quality evaluation metric based on an estimate of the geolocation of a first entity at a first time, one or more first sets of geolocation input data associated with the first entity and obtained at or around the first time, an estimate of the geolocation of a second entity at or around a second time, and one or more second sets of geolocation input data associated with the second entity and obtained at or around the second time. A set of geolocation input data may include one or more measurements, one or more observations, and/or one or more configurations. The first entity and the second entity may be the same entity or may be different entities. Similarly, the first time and the second time may be the same time or different times.

In some implementations, the estimates of the locations of the first and second entities may be the same or approximately the same (e.g., within a pre-defined distance) and the first and second sets of geolocation input data may be substantially different. In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being the same or approximately the same and the first and second sets of geolocation input data being the same or substantially the same. In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being substantially different and the first and second sets of geolocation input data being substantially different.

In some implementations, the estimates of the locations of the first and second entities may be substantially different and the first and second sets of geolocation input data may be the same or substantially the same (e.g., within a predetermined range (e.g., within 1%, 5%, 10%, and/or the like)). In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being the same or approximately the same and the first and second sets of geolocation input data being the same or substantially the same. In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being substantially different and the first and second sets of geolocation input data being substantially different.

In some implementations, the estimates of the locations of the first and second entities may be the same or substantially the same and the first set of geolocation input data may include a particular measurement, observation, and/or configuration that is not included in the second set of geolocation input data. For example, the first set of geolocation input data may include a reference signal received power (RSRP) associated with a first base station and the second set of geolocation input data may not include the RSRP associated with the first base station. In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being the same or approximately the same and the first and second sets of geolocation input data including the same sets of measurements, observations, and configurations. In these implementations, the first quality evaluator function may generate a first quality evaluation metric having a value that is lower, less favorable, indicates a lower accuracy, and/or the like than a value of a second quality evaluation metric that is generated based on the estimates of the locations of the first and second entities being substantially different and the first set of geolocation input data including a particular measurement, observation, and/or configuration that is not included in the second set of geolocation input data.

In some implementations, the one or more quality evaluator functions include a second quality evaluator function. The second quality evaluator function may generate a quality evaluation metric (e.g., a raw quality evaluation metric) based on comparing sequences of geolocation estimates and sets of geolocation input data relating to a first entity and a second entity. For example, the second quality evaluator function may generate a quality evaluation metric based on a sequence of estimates of the location of a first entity during a first time period, a first sequence of one or more sets of geolocation input data associated with the first entity obtained during the first time period, a sequence of estimates of the location of a second entity during a second time period, and a second sequence of one or more sets of geolocation input data associated with the second entity obtained during the second time period. The first entity and the second entity may be the same entity or may be different entities. Similarly, the first time period and the second time period may be the same time period or different time periods.

In some implementations, the sequences of estimates of the locations of the first and second entities follow a same or similar trajectory and the first and second sequences of the one or more sets of geolocation input data are substantially different. In these implementations, the second quality evaluator function may generate a first quality evaluation metric having a value that is lower, less favorable, indicates a lower accuracy, and/or the like than a value of a second quality evaluation metric that is generated based on the sequences of estimates of the locations of the first and second entities following a same or similar trajectory and the first and second sequences of one or more sets of geolocation input data being the same or similar. In these implementations, the second quality evaluator function may generate a quality evaluation metric having a value that is lower, less favorable, indicates a lower accuracy, and/or the like than a value of a quality evaluation metric that is generated based on the sequences of estimates of the locations of the first and second entities following substantially different trajectories and the first and second sequences of the one or more sets of geolocation input data being substantially different.

Two sequences of one or more sets of geolocation input data may be considered the same or similar when a sequence of one or more particular measurements, observations, and/or configurations follow a similar pattern, trend, cycle, or distribution in the two sequences and/or when the Nth derivative (where N is a member of the set of natural numbers) of a sequence of one or more particular measurements, observations, and/or configurations follow a similar pattern, trend, cycle, or distribution in the two sequences. Two sequences of one or more sets of geolocation input data may be considered substantially different when two sequences of sets of measurements, observations, and/or configurations are not the same or are not substantially similar (e.g., outside of a predetermined range, a difference satisfies a difference threshold, and/or the like).

In some implementations, the sequences of estimates of the locations of the first and second entities follow substantially different trajectories and the first and second sequences of one or more sets of geolocation input data are the same or similar. In these implementations, the second quality evaluator function may generate a first quality evaluation metric having a value that is lower, less favorable, indicates a lower accuracy, and/or the like than a value of a second quality evaluation metric that is generated based on the sequences of estimates of the locations of the first and second entities following a same or similar trajectory and the first and second sequences of the one or more sets of geolocation input data being the same or similar. In these implementations, the second quality evaluator function may generate a quality evaluation metric having a value that is lower, less favorable, indicates a lower accuracy, and/or the like than a value of a quality evaluation metric that is generated based on the sequences of estimates of the locations of the first and second entities following substantially different trajectories and the first and second sequences of the one or more sets of geolocation input data being substantially different.

In some implementations, the one or more quality evaluator functions include a third quality evaluator function. The third quality evaluator function may generate a quality evaluation metric (e.g., a raw quality evaluation metric) based on comparing sets of geolocation estimates relating to a first group of one or more entities and a second group of one or more entites and/or attributes associated with the sets of geolocation estimates. Alternatively, and/or additionally, the third quality evaluator function may generate a quality evaluation metric based on comparing sets of geolocation estimates relating to a first group of one or more entities and one or more population densities associated with the entities with which the geolocation estimates are related. In some implementations, the population densities are produced by the geolocation estimation model. Alternatively, and/or additionally, the population densities may be obtained from another device (e.g., a third-party server device).

As an example, the third quality evaluator function may receive, as an input, two or more groups to be compared. A group may consist of a single geolocation estimate for a single entity; multiple geolocation estimates for a single entity; a set of single geolocation estimates for each of multiple entities; a set of multiple geolocation estimates for each of multiple entities; a set of one or more geolocation estimates for each of multiple entities; and/or attributes summarizing or characterizing the distribution of a population of positions. The attributes may include a mean, a median, a mode, a standard deviation, a variance statistical measure, a histogram, polygons of density characteristics, polyhedrons of density characteristics, and/or another representation of a population of entities. The population may represent a single entity, one or more subsets of related entities, and/or the entire population of entities.

In some implementations, the selection of the population of entities is made on a temporal basis. For example, the selection of the population of entities may be selected based on a time period concurrent with a time period associated with one or more other groups of the two or more groups; based on a time period immediately preceding a time period associated with one or more other groups of the two or more groups; based on a time period expected to have similar or different relevant characteristics (e.g., the previous day, the same day from the previous week, the previous month, the entire history of geolocation estimates collected in the geolocation system, and/or the like). In some implementations, a time period includes a future time with respect to other groups of the two or more groups. For example, the time period may be selected based on a set of one or more predicted future geolocations, a set or population of geolocations which represent the future locations of entities for which similar locations or similar trajectories have historically been determined, and/or the like.

In some implementations, one or more geolocation estimates for an entity around a particular time of day of a particular day of the week are concentrated in a particular area(s), and the historical average for geolocation estimates for that entity around the particular time of day on that particular day of the week is concentrated in a substantially different area(s). In these implementations, the third quality evaluator function may generate a first quality evaluation metric having a value that is lower, less favorable, indicates a lower accuracy, and/or the like than a value of a second quality evaluation metric that is generated based on the one or more geolocation estimates for an entity around a particular time of day of a particular day of the week and concentrated in a particular area(s), and the historical average for geolocation estimates for that entity around the particular time of day on that particular day of the week being concentrated in the same or substantially the same area(s).

In some implementations, one or more geolocation estimates for a set of entities are concentrated in a particular area(s), and an independent estimate of the geographical distribution of the first set of entities is concentrated in a substantially different area(s). In these implementations, the third quality evaluator function may generate a first quality evaluation metric having a value that is lower, less favorable, indicates a lower accuracy, and/or the like than a value of a second quality evaluation metric that is generated based on one or more geolocation estimates for a set of entities being concentrated in a particular area(s), and an independent estimate of the geographical distribution of the first set of entities being concentrated in the same or substantially the same area(s). Independent estimates may be derived from surveys, censuses, person counts, entity counts, government records, provisioning information, and/or the like.

In some implementations, the one or more quality evaluator functions include a fourth quality evaluator function. The fourth quality evaluator function may generate a quality evaluation metric (e.g., a raw quality evaluation metric) based on geolocations relative to other entities. For example, the fourth quality evaluator function may generate a quality evaluation metric based on an estimate of the location of a first entity at a first time and either one or more sets of geolocation input data (e.g., one or more sets of measurements, observations, and/or configurations) that allow the relative location or one or more components of the relative location of the first entity at the first time and a second entity at a second time to be measured and/or estimated; or information about the relative location or one or more components of the relative location of the first entity at the first time and a second entity at a second time. The first and second entities may be the same or different entities and the first and second times may be the same or different times.

In some implementations, the second entity may comprise a base station, a radio, an amplifier, a cell, an antenna, and/or the like in a wireless network. In some implementations, the second entity may comprise a sensor not included in a wireless network. For example, the second entity may comprise an active sensor and/or a passive sensor positioned at a known location. In some implementations, the second entity may comprise a ranger, radar, LiDAR, sonar, scatterometer, sounder, remote sensing device, and/or the like. In some implementations, the one or more sets of geolocation input data may include a configuration characteristic and/or an operating characteristic associated with the second entity. For example, the one or more sets of geolocation input data may include a geolocation, an elevation, an antenna orientation, a direction of transmission, and/or the like associated with the second entity. In some implementations, the geolocation system determines the one or more sets of geolocation input data based on planning data, telemetry, and/or the like.

In some implementations, an estimate of the relative geolocations of the first and second entities is an estimate of a distance between the first and second entities, an estimate of the upper bound on the distance between the first and second entities, and/or an estimate of the lower bound on the distance between the first and second entities. The distance may be estimated based on a round-trip signal propagation delay, a one-way signal propagation delay, a timing advance, a time of transmission, a time of reception, a time of detection, the detection of the presence of a transmitter, the failure to detect the presence of a transmitter, data obtained by a laser ranger, data obtained by radar, data obtained by LiDAR, data obtained by sonar, data obtained by a scatterometer, data obtained by a sounder, data obtained by a sensor (e.g., an accelerometer, a magnetometer, a step counter, and/or the like), analysis of an image or video, and/or the like. In some implementations, distance estimates based on signal propagation may take into account non-line-of-sight propagation arising from clutter and other environmental effects.

In some implementations, the relative location may be estimated based on a first transmitting device, a second transmitting device, and/or estimates of the locations of multiple entities at or around a time T. The fourth quality evaluator function may determine for each entity with estimates of location (e.g., the first entity and/or the second entity), a measurement of the time elapsed between reception by the entity of a signal transmitted by the first transmitting device and a reception by the entity of a signal transmitted by the second transmitting device (e.g., the time difference of arrival (TDOA)).

In some implementations, one or more sets of geolocation input data may indicate locations of a first transmitting device and a second transmitting device, a time elapsed between a time at which a transmission (e.g., an electromagnetic wave, sound, a pressure variation in a solid, liquid or gaseous medium, a moving particle, a moving object, and/or the like) by the first transmitting device is emitted and a time at which a transmission by the second transmitting device is emitted (e.g., a time difference of transmission (TDOT)), the TDOA of the transmission by the first transmitting device and/or the second transmitting device at the first entity and/or the second entity. The TDOA of the transmissions by the first transmitter and/or the second transmitter at the first entity and/or the second entity may be inconsistent with one or more of a distance between the estimate of the location of the first entity and/or the second entity and the location of the first transmitting device, a speed of propagation of the transmission from the first transmitting device, a distance between the estimate of the location of the first entity and/or the second entity and the location of the second transmitting device, the speed of propagation of the transmission by the second transmitting device, and/or the TDOT. In these implementations, the fourth quality evaluator function may generate a first quality evaluation metric that is lower, less favorable, indicates a lower accuracy, and/or the like than a value of a second quality evaluation metric that is generated based on the TDOA of the transmissions by the first transmitter and/or the second transmitter at the first entity and/or the second entity being consistent or approximately consistent with each of a distance between the estimate of the location of the first entity and/or the second entity and the location of the first transmitting device, a speed of propagation of the transmission from the first transmitting device, a distance between the estimate of the location of the first entity and/or the second entity and the location of the second transmitting device, the speed of propagation of the transmission by the second transmitting device, and/or the TDOT.

In some implementations, the fourth quality evaluator function may generate a less favorable quality evaluation metric based on the location of the first transmitting device, the location of the second transmitting device, and/or the time elapsed between the time at which a transmission by the first transmitting device is emitted and the time at which a transmission by the second transmitting device is emitted are unknown parameters; based on there being no values for the unknown parameter or parameters that satisfy each TDOA measurements of the transmissions by the first and second transmitting devices at the first entity and/or the second entity with location estimates given the distance between the estimate of the location of each entity and the actual or putative location of the first transmitting device; the speed of propagation of the transmission by the first transmitter; the distance between the estimate of the location of each entity and the actual or putative location of the second transmitting device; the speed of propagation of the transmission by the second transmitting device; and/or the actual or putative TDOT.

Alternatively, and/or additionally, the distance may be estimated based on data obtained by a third entity. For example, a third entity may be positioned to observe the first and second entities and may include one or more devices (e.g., a sensor (e.g., an accelerometer, a magnetometer, a step counter, and/or the like), a laser ranger, radar, LiDAR, sonar, a scatteromeer, a sounder, an image or video, and/or the like) configured to obtain data from which an estimate of the relative geolocations of the first and second entities can be made. The third entity may utilize the one or more devices to obtain the data. In some implementations, the third entity may generate an estimate of the relative geolocations of the first and second entities based on the data. For example, the third entity may generate an estimate of a distance between the first and second entities, an estimate of the upper bound on the distance between the first and second entities, and/or an estimate of the lower bound on the distance between the first and second entities. Alternatively, and/or additionally, the third entity may provide the data to the geolocation system (e.g., the fourth quality evaluator function) and the geolocation system may generate an estimate of one or more components of an estimate of a distance between the first and second entities.

In some implementations, the estimate of the relative geolocations of the first and second entities includes an estimate of a bearing of the first entity relative to the second entity and/or a bearing of the second entity relative to the first entity. The bearing may correspond to a direction in the horizontal plane, a direction in the vertical plane, a direction in a 3-dimensional polar spatial coordinate system, and/or the like. The bearing may be estimated based on an angle of arrival of an electromagnetic signal travelling between the first and second entities, an angle of departure of an electromagnetic signal travelling between the first and second entities, analysis of an image or video, data obtained by one or more sensors (e.g., an accelerometer, a magnetometer, and/or the like) associated with the first entity and/or the second entity, and/or the like.

In some implementations, the estimate of the relative geolocations of the first and second entities includes an estimate of a height of the first entity and a height of the second entity with respect to a reference surface (e.g., the ground, a reference ellipsoid, and/or the like). The height may be estimated based on data obtained by a laser ranger, a radar, a LiDAR, a sonar, a scatterometer, a sounder, an altimeter, a barometer, and/or the like. Alternatively, and/or additionally, the height may be estimated based on analysis of an image and/or a video. In some implementations, the estimate of the relative geolocations of the first and second entities includes a distance, offset, separation, and/or the like calculated by virtue of the first and second entities being fixed to a rigid structure such as a bow and a stern of a ship, opposite wingtips of an aircraft, a hood and a trunk of a vehicle, and/or the like. In some implementations, the geolocation system may obtain information identifying the locations of the first and second entities from a data structure (e.g., a database, a table, and/or a list, among other examples).

In some implementations, a value or an estimate of one or more components of the geolocation of the second entity at the second time is known and one or more components of the geolocation of the first entity at the first time relative to the second entity at the second time estimated from the one or more sets of geolocation input data is substantially in disagreement (e.g., different by at least a threshold amount) with the geolocation estimate of the first entity at the first time relative to the one or more components of the geolocation of the second entity at the second time. In these implementations, the fourth type of quality evaluator function may generate a first quality evaluation metric having a value that is lower, less favorable, indicates a lower accuracy, and/or the like than a value of a second quality evaluation metric that is generated based on one or more components of the geolocation of the second entity at the second time being known and one or more components of the geolocation of the first entity at the first time relative to the second entity at the second time estimated from the one or more sets of geolocation input data being substantially in agreement (e.g., within a threshold amount, the same, substantially the same, and/or the like) with the geolocation estimate of the first entity at the first time relative to the one or more components of the geolocation of the second entity at the second time.

In some implementations, one or more components of the geolocation of the first entity at the first time relative to the second entity at the second time estimated from the one or more sets of geolocation input data is substantially in disagreement (e.g., different by at least a threshold amount) with the geolocation estimate of the first entity at the first time relative to the geolocation estimate of the second entity at the second time. In these implementations, the fourth type of quality evaluator model may generate a first quality evaluation metric having a value that is lower, less favorable, indicates a lower accuracy, and/or the like than a value of a second quality evaluation metric that is generated based on one or more components of the geolocation of the first entity at the first time relative to the second entity at the second time estimated from the one or more sets of geolocation input data being substantially in agreement (e.g., within a threshold amount, the same, substantially the same, and/or the like) with the geolocation estimate of the first entity at the first time relative to the geolocation estimate of the second entity at the second time.

In some implementations, the first and second entities are co-located and have no meaningful separation. The first and second entities may be co-located based on the first and second entities being associated with the same object (e.g., the first and second entities are the same person, vehicle, machine, device, and/or the like), the first and the second entities approaching each other, and/or the like. For example, the first and second entities may be user devices and the users associated with the first and second entities may be conducting an in-person meeting, the first and second entities may have a short-range sensing capability, and at least one of the first and second entities may determine and/or report the presence of the other entity. In some implementations, the geolocation system determines that the first and second entities are co-located based on analyzing the temporal signatures of measurements performed by the first and second entities and determining that the temporal signatures of measurements match sufficiently over a period of time. When the first and second entities are known to be co-located, and the geolocation estimate of the first entity at a first time differs significantly from the geolocation estimate of the second entity at the second time (e.g., when a distance between the first entity and the second entity satisfies a distance threshold, is greater than a particular distance, and/or the like), the fourth quality evaluator function may generate a first quality evaluation metric having a value that is lower, less favorable, indicates a lower accuracy, and/or the like than a value of a second quality evaluation metric that is generated when the geolocation estimate of the first entity at a first time and the geolocation estimate of the second entity at the second time are approximately the same (e.g., when a distance between the first entity and the second entity satisfies a distance threshold, is less than a particular distance, and/or the like).

In some implementations, the one or more quality evaluator functions include a fifth quality evaluator function. The fifth quality evaluator function may calculate a quality evaluation metric (e.g., a raw quality evaluation metric) based on a geolocation estimate for an entity and an inference associated with a likelihood that the entity could reasonably be expected to be at the estimated geolocation. As an example, an entity may be associated with (e.g., included in) an automobile and an estimated geolocation for the entity may correspond to a location in a large body of water (e.g., a river, an ocean, and/or the like). The fifth quality evaluator function may generate a first quality evaluation metric based on the estimated geolocation for the entity corresponding to a location in a large body of water having a value that is lower, less favorable, indicates a lower accuracy, and/or the like than a value of a second quality evaluation metric that is generated based on an estimated geolocation for the entity corresponding to a location on a paved road.

As another example, an entity may be associated with (e.g., included in) a user device, an estimated geolocation for the entity may correspond to a location in a restricted area, and a user of the user device may not be associated with a permission associated with having access to the restricted area. The fifth quality evaluator function may generate a first quality evaluation metric based on the estimated geolocation for the entity corresponding to a location in the restricted area and the user not being associated with a permission associated with having access to the restricted area. The first quality evaluation metric may have a value that is lower, less favorable, indicates a lower accuracy, and/or the like than a value of a second quality evaluation metric that is generated based on the estimated geolocation for the entity corresponding to a location in an unrestricted area and/or the user being associated with a permission associated with having access to the restricted area.

As another example, an entity may be associated with (e.g., included in) a user device, an estimated geolocation for the entity may correspond to a location that is within or adjacent to a building, the location may be elevated a first distance above the ground, and a height of the building may be less that the first distance. The fifth quality evaluator function may generate a first quality evaluation metric based on the estimated geolocation for the entity corresponding to a location that is within or adjacent to the building, the location being elevated the first distance above the ground, and the height of the building being less than the first distance. The first quality evaluation metric may have a value that is lower, less favorable, indicates a lower accuracy, and/or the like than a value of a second quality evaluation metric that is generated based on the estimated geolocation for the entity corresponding to a location that is within or adjacent to the building, the location being elevated the first distance above the ground, and the height of the building being greater than the first distance.

As another example, an entity may be associated with (e.g., included in) a user device, an estimated geolocation for the entity may correspond to a location that is below ground level at that location and where no basement, subway, cave, subterranean structure and/or the like exists. The fifth quality evaluator function may generate a first quality evaluation metric based on the estimated geolocation for the entity corresponding to a location that is below ground level at that location and where no basement, subway, cave, subterranean structure and/or the like exists. The first quality evaluation metric may have a value that is lower, less favorable, indicates a lower accuracy, and/or the like than a value of a second raw quality evaluation metric that is generated based on the estimated geolocation for the entity corresponding to a location that is at or above ground level at that location.

In some implementations, the one or more quality evaluator functions include a sixth quality evaluator function. The sixth quality evaluator function may calculate a quality evaluation metric (e.g., a raw quality evaluation metric) based on a trajectory between geolocation estimates for an entity and an inference associated with a likelihood that the entity could reasonably be expected to travel a route corresponding to the trajectory. The sixth quality evaluator function may calculate a quality evaluation metric based on a sequence of estimates of the location of the entity as the estimated geolocation evolves over time. The sixth quality evaluator function may determine that the entity could not reasonably be expected to travel a route corresponding to a trajectory associated with the geolocation estimates, based on determining that a transition between geolocation estimates would require the entity to travel at an excessive speed (e.g., a speed greater than a threshold speed), that a trajectory between geolocation estimates requires the entity to travel over a particular type of terrain that the entity is not capable of traveling over (e.g., would require an automobile to travel over a large body of water), travel in a way that is not consistent with the geolocation (e.g., would require the entity to travel upwards within a building and the geolocation within the building is not associated with a set of stairs, an elevator, and/or the like), travel through a solid structure, and/or the like.

The sixth quality evaluator function may generate a first quality evaluation metric based on determining that the entity could not reasonably be expected to travel a route corresponding to a trajectory associated with the geolocation estimates. The first quality evaluation metric may have a value that is lower, less favorable, indicates a lower accuracy, and/or the like than a value of a second quality evaluation metric that is generated based on determining that the entity could reasonably be expected to travel a route corresponding to a trajectory associated with the geolocation estimates.

In some implementations, the sixth quality evaluator function may determine that the sequence of geolocation estimates exhibits unexpected, unexplainable, and/or erratic behavior. For example, the sixth quality evaluator function may determine that the sequence of geolocation estimates exhibits unexpected, unexplainable, and/or erratic behavior based on a model that characterizes that the typical, average, and/or aggregate movements of vehicles, pedestrians, user devices, machines, and/or the like do not agree sufficiently with the sequence of geolocation estimates for the entity, the route taken from an origin to a destination is not a route that a user, navigation system, and/or the like could reasonably be expected to choose, and/or the like.

The sixth quality evaluator function may generate a first quality evaluation metric based on determining that the sequence of geolocation estimates exhibits unexpected, unexplainable, and/or erratic behavior. The first quality evaluation metric may have a value that is lower, less favorable, indicates a lower accuracy, and/or the like than a value of a second raw quality evaluation metric that is generated based on determining that the sequence of geolocation estimates does not exhibit unexpected, unexplainable, and/or erratic behavior.

In some implementations, the one or more quality evaluator functions include a seventh quality evaluator function. The seventh quality evaluator function may calculate a quality evaluation metric (e.g., a raw quality evaluation metric) based on a velocity, acceleration, and/or a higher order derivative of geolocation derived from a sequence of geolocation estimates of an entity over a period of time. For example, the seventh quality evaluator function may determine a sequence of geolocation estimates for an entity that are associated with time stamps indicating that an acceleration of the entity is greater than an acceleration that the entity is capable of achieving based on a restriction of peak power, wheel traction, braking force, mass of the entity, and/or the like, and/or that the acceleration of the entity is greater than an acceleration that the entity is capable of enduring based on a design, engineering, manufacturing constraints, limitations of a biological system, and/or the like.

The seventh quality evaluator function may generate a first quality evaluation metric based on determining that the sequence of geolocation estimates for the entity that are associated with time stamps indicating that the acceleration of the entity is greater than an acceleration that the entity is capable of achieving based on a restriction of peak power, wheel traction, braking force, and/or the like, and/or that the acceleration of the entity is greater than an acceleration that the entity is capable of enduring based on a design, engineering, manufacturing constraints, limitations of a biological system, and/or the like. The first quality evaluation metric may have a value that is lower, less favorable, indicates a lower accuracy, and/or the like than a value of a second quality evaluation metric that is generated based on determining that the sequence of geolocation estimates for an entity that are associated with time stamps indicating that an acceleration of the entity is not greater than an acceleration that the entity is capable of achieving based on a restriction of peak power, wheel traction, braking force, and/or the like and/or that the acceleration of the entity is not greater than an acceleration that the entity is capable of enduring based on a design, engineering, manufacturing constraints, limitations of a biological system, and/or the like.

In some implementations, the one or more quality evaluator functions include an eighth quality evaluator function. The eighth quality evaluator function may calculate a quality evaluation metric (e.g., a raw quality evaluation metric) based on counts or estimated counts of a volumes of people, vehicles, and/or other entities passing a particular location, or passing a particular location in a particular direction, or traversing, or traversing in a particular direction, a particular road, highway, street, cycleway, track, path, corridor, point of ingress/egress, ski run, shipping lane or other route on water, aircraft lane, and/or other thoroughfare. For example, the eighth quality evaluator function may determine that a quantity of geolocation estimates indicate that a first quantity of entities have passed a particular location during a first time interval and that an independent count of the quantity of entities passing the particular location is different from the first quantity. The eighth quality evaluator function may determine that the quantity of geolocation estimates indicate that the first quantity of entities have passed the particular location during the first time interval based on one or more trajectories between geolocation estimates for each of a set of entities and a first quantity of sub-trajectories of the set of aggregate trajectories of geolocated entities are located sufficiently close to (e.g. within a threshold distance of) the particular location during the first time interval. In some implementations, an independent count of the quantity of entities passing the particular location may be based on counts of entities from a traffic flow counter, a turnstile, an access control system, a count performed by a human being, and/or the like.

The eighth quality evaluator function may generate a first quality evaluation metric based on one or more trajectories between geolocation estimates for each of a set of entities and a first quantity of sub-trajectories of the set of aggregate trajectories of geolocated entities are located sufficiently close to (e.g. within a threshold distance of) a particular location during the first time interval and that the independent count of the quantity of entities passing the particular location is substantially different (e.g., different by at least a threshold amount) from the first quantity. The first quality evaluation metric may have a value that is lower, less favorable, indicates a lower accuracy, and/or the like than a value of a second quality evaluation metric that is generated based on one or more trajectories between geolocation estimates for each of a set of entities and a first quantity of sub-trajectories of the set of aggregate trajectories of geolocated entities are located sufficiently close to (e.g. within a threshold distance of) a particular location during the first time interval and that an independent count of the quantity of entities passing the particular location is substantially similar (e.g., within a threshold amount, the same, substantially the same, and/or the like) to the first quantity. In some implementations, the eighth quality evaluator function may generate the quality evaluation metric having the first value based on determining that the eighth quality evaluator function is not determining geolocation estimates for all entities passing the particular location and/or that the eighth evaluator function is determining geolocation estimates for a particular percentage of all entities passing the particular location and the first quantity is substantially different from the particular percentage of the independent count of the quantity of entities passing the particular location.

In some implementations, the one or more quality evaluator functions include a ninth quality evaluator function. The ninth quality evaluator function may calculate a quality evaluation metric (e.g., a raw quality evaluation metric) based on cases where the distribution and/or counts of multiple geolocation estimates reveal density fluctuations that are correlated with the characteristics of the entities involved in generating data input to a geolocation estimation function, associated data (e.g., the geolocation input data), and/or with environmental characteristics such as topographic or geographical features, roads, other transportation routes, buildings, and/or other structures. For example, the ninth quality evaluator function may analyze a density distributions of multiple geolocation estimates to determine whether an approximation of a shape (e.g., a circle, a circle sector, an annulus, an annular section, an ellipse, a parabola, a hyperbola, a polygon, an ellipse section, a sphere, a portion of a sphere, an ellipsoid, a paraboloid, a hyperboloid, a polyhedron, and/or the like), with a characteristic (e.g. a center, focus, corner, edge, tangent, normal, and/or the like) approximately coinciding (meeting, intersecting, passing within a threshold distance of, and/or the like) with the location of a base station, transmitter, receiver, remote sensing system, other entity included in geolocation input data, and/or the like, is detected in the density distributions of geolocation estimates. The ninth quality evaluator function may detect the shape based on performing a process (e.g., image processing, an image segmentation process, an edge detection process, and/or the like) on the density distributions and/or based on utilizing a shape recognition algorithm, a neural network, machine learning, and/or the like to detect the shape.

The ninth quality evaluator function may generate a first quality evaluation metric based on determining that the shape, centered on the base station, transmitter, receiver, remote sensing system, and/or the like, is detected in the density of distributions of geolocation estimates. The first quality evaluation metric may have a value that is lower, less favorable, indicates a lower accuracy, and/or the like than a value of a second quality evaluation metric that is generated based on determining that the shape, centered on the base station, transmitter, receiver, sensor, and/or the like is not detected, and/or is detected with less intensity, definition, magnitude and/or the like, in the density of distributions of geolocation estimates.

In some implementations, the ninth quality evaluator function may analyze a density distribution of multiple geolocation estimates and a set of one or more topographic or geographical features (roads, other transportation routes, buildings, other structures, and/or the like). The ninth quality evaluator function may determine a set of one or more geometric transformations (translations, rotations, scalings, reflections, linear transformation using tensor arithmetic, non-linear transformation using tensor arithmetic, and/or the like) of the density distribution that produces a strong correlation between the density distribution of multiple geolocation estimates and one or more of the topographic or geographical features. The ninth quality evaluator function may determine a set of one or more geometric transformations based on performing a process (e.g., image processing, an image segmentation process, an edge detection process, and/or the like) on the density distributions and features and/or based on utilizing a neural network, machine learning, and/or the like.

The ninth quality evaluator function may generate a first quality evaluation metric based on determining that the density distribution of the geolocation estimates subject to one or more substantial (exceeds a threshold, results in a transformation of one or more geolocation estimate that exceeds a distance, and/or the like) geometric transformations and one or more of the topographic or geographical features are strongly correlated. The first quality evaluation metric may have a value that is lower, less favorable, indicates a lower accuracy, and/or the like than a value of a second quality evaluation metric that is generated based on the density distribution of the geolocation estimates subject to one or more substantial (exceeds a threshold, results in a transformation of one or more geolocation estimate that exceeds a distance, and/or the like) geometric transformations and one or more of the topographic or geographical features are less strongly correlated.

The ninth quality evaluator function may generate a first quality evaluation metric based on determining the strongest correlation of the density distribution of the geolocation estimates and one or more of the topographic or geographical features when the density distribution of the geolocation estimates are subject to no substantial geometric transformations. The first quality evaluation metric may have a value that is lower, less favorable, indicates a lower accuracy, and/or the like than a value of a second quality evaluation metric that is generated based on determining a higher level of correlation of the density distribution of the geolocation estimates and one or more of the topographic or geographical features when the density distribution of the geolocation estimates are subject to no substantial geometric transformations.

In some implementations, the one or more quality evaluator functions include a tenth quality evaluator function. The tenth quality evaluator function may calculate a quality evaluation metric (e.g., a raw quality evaluation metric) based on a first sequence of geolocation estimates of an entity that are produced by the geolocation estimation model using only geolocation input data available to the geolocation estimation model prior to a first time, a second sequence of geolocation estimates of the entity that are produced by the geolocation estimation model using only geolocation input data available to the geolocation estimation model prior to a second time that is subsequent to the first time, and/or a set of one or more predictions of locations of the entity at one or more times subsequent to the first time and prior to the second time produced by a predictive analytics function based on the first sequence of geolocation estimates of the entity.

For example, the tenth quality evaluator function may determine that the set of one or more predictions of locations of the entity are inconsistent with the second sequence of geolocation estimates of the entity. The tenth quality evaluator function may generate a first quality evaluation metric based on determining that the set of one or more predictions of locations of the entity are not substantially similar to (contains one or more predictions that are in disagreement with, contains one or more predictions that have more than a threshold distance disagreement with, describes a substantially different trajectory, and/or the like) the second sequence of geolocation estimates of the entity. The first quality evaluation metric may have a value that is lower, less favorable, indicates a lower accuracy, and/or the like than a value of a second quality evaluation metric that is generated based on determining that one or more predictions in the set of one or more predictions of locations of the entity are substantially similar to (contains less than a threshold number of predictions that are in disagreement with, contains less than a threshold number of predictions that are have more than a threshold distance disagreement with, describes a substantially similar trajectory, and/or the like) the second sequence of geolocation estimates of the entity.

In some implementations, the predictive analytics function and the geolocation estimation model are separate. For example, the predictive analytics function and the geolocation estimation model may be included in different devices. In these implementations, an output of the tenth quality evaluator function may be used to increase an accuracy of the geolocation estimation model associated with geolocation estimates that can be used to estimate future geolocations. In some implementations, the geolocation estimation model may include the predictive analytics function. The geolocation estimation model may generate geolocation predictions in addition to geolocation estimates. In these implementations, an output of the tenth quality evaluator function may be used to increase an accuracy of the geolocation estimation model associated with estimating future geolocations.

In some implementations, the one or more quality evaluator functions include an eleventh quality evaluator function. The eleventh quality evaluator function may calculate a quality evaluation metric (e.g., a raw a quality evaluation metric) based on a classification of a state class for an entity.

For example, the eleventh quality evaluator function may determine that geolocation estimates for an entity correspond to locations inside a building and the entity is associated with the class "outdoors," that geolocation estimates for an entity are associated with a velocity of tens of meters per second and the entity associated with the class "pedestrian," and/or that geolocation estimates for an entity correspond to locations on a road and the entity is associated with the class "railway." The eleventh quality evaluator function may generate a first quality evaluation metric based on the determination. The first quality evaluation metric may have a value that is lower, less favorable, indicates a lower accuracy, and/or the like than a value of a second quality evaluation metric that is generated based on determining that geolocation estimates for an entity correspond to locations located inside a building and the entity is associated with the class "indoors," that geolocation estimates for an entity are associated with a velocity of tens of meters per second and the entity associated with the class "vehicular," and/or that geolocation estimates for an entity correspond to locations on a road and the entity is associated with the class "automobile."

The above-listed quality evaluator functions are intended to be merely examples of types of quality evaluator functions that may be used. In practice, the one or more quality evaluator functions may include any one or more of the above-listed quality evaluator functions (or combinations thereof), and/or one or more other types of quality evaluator functions not listed above.

Figure 1B:
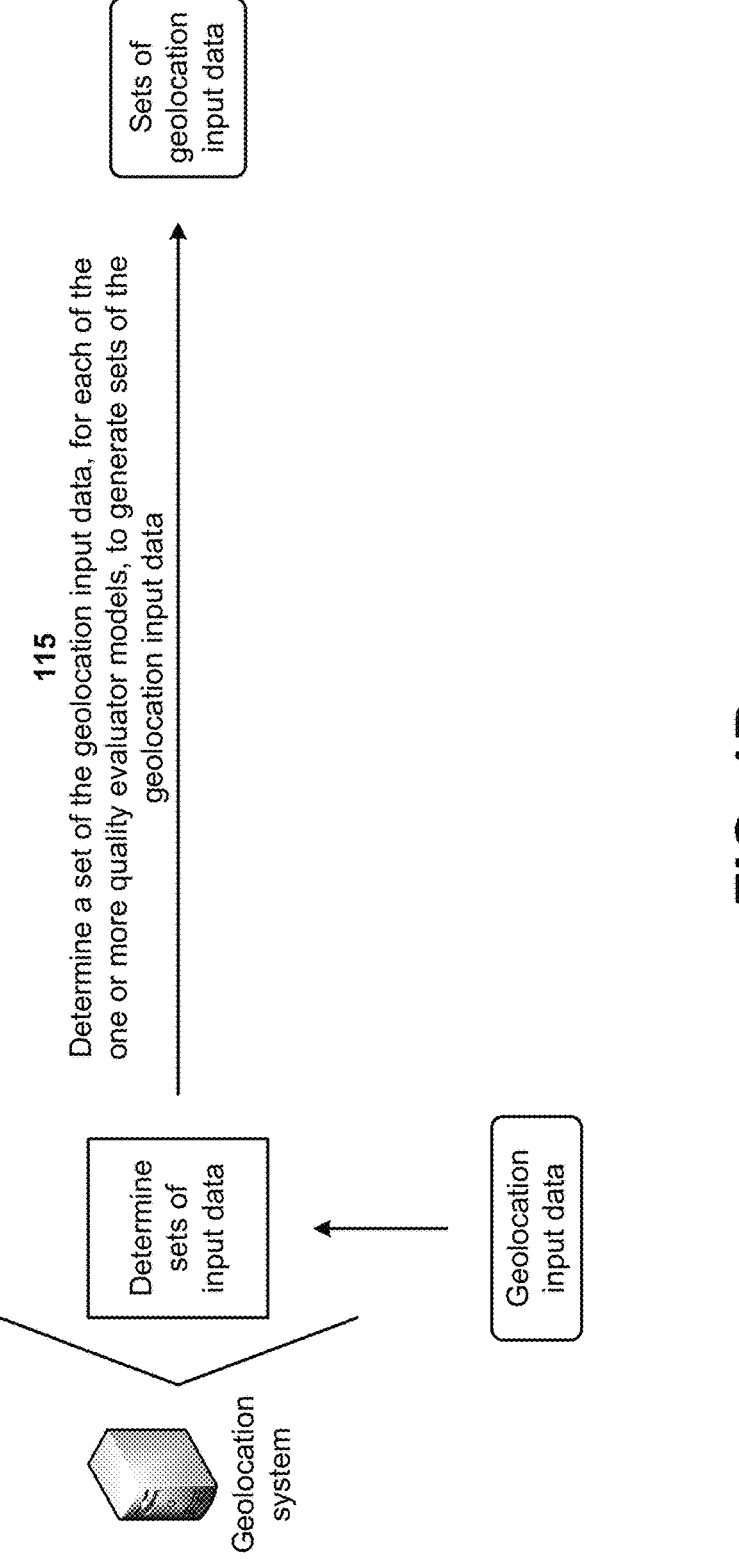

As shown in FIG. 1B, and by reference number 115, the geolocation system determines a set of the geolocation input data, for each of the one or more quality evaluator models, to generate sets of the geolocation input data. The geolocation system may determine a set of geolocation input data for a quality evaluator model based on a quantity of quality evaluator functions included in the quality evaluator model, a type of evaluator function included in the quality evaluator model, and/or the like.

Figure 1C:
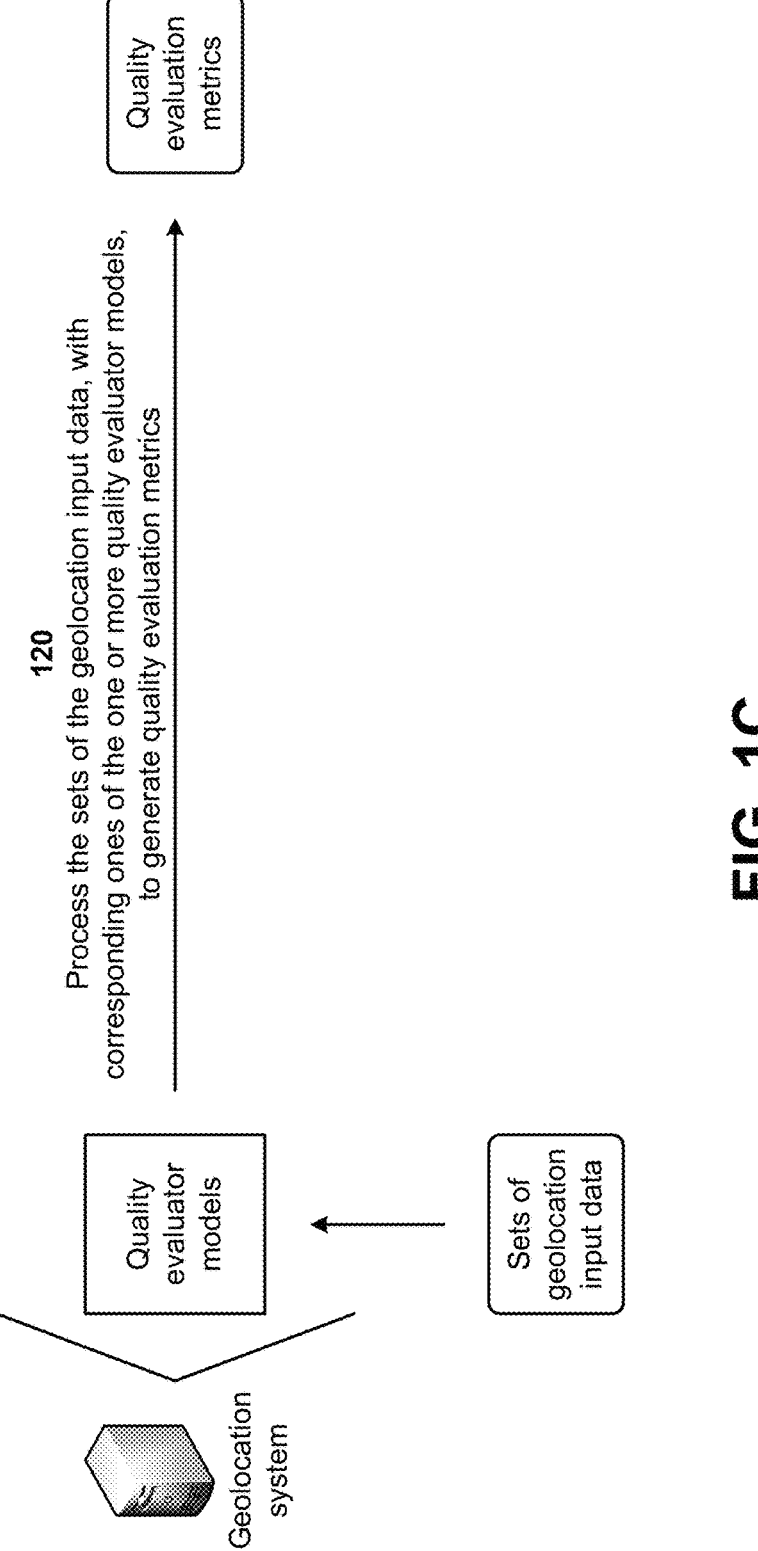

As shown in FIG. 1C, and by reference number 120, the geolocation system processes the sets of the geolocation input data, with corresponding ones of the one or more quality evaluator models, to generate quality evaluation metrics (e.g., raw quality evaluation metrics). For example, geolocation system may provide one or more sets of the geolocation input data and one or more geolocation estimates determined by the geolocation estimation model as inputs to a quality evaluator model based on the one or more sets of geolocation input data to a quality evaluator model. The quality evaluator model may generate one or more quality evaluation metrics based on the one or more sets of the geolocation input data and the one or more geolocation estimates. A quantity of the one or more quality evaluation metrics may correspond to a quantity of quality evaluator functions associated with the quality evaluator model. For example, the quality evaluator model may generate a single quality evaluation metric when the quality evaluator model includes a single quality evaluator function and may generate multiple quality evaluation metrics when the geolocation evaluator model includes multiple quality evaluator functions.

In some implementations, a quality evaluator function is applied once to an individual geolocation estimate and the geolocation input data associated with the individual geolocation estimate. In some implementations, a quality evaluator function is applied once to a set of geolocation estimates and the geolocation input data associated with the set of geolocation estimates.

In some implementations, a quality evaluator function is applied multiple times to different individual geolocation estimates and the geolocation input data associated with the different individual geolocation estimates and/or to different sets of geolocation estimates and the geolocation input data associated with the different sets of geolocation estimates. In these implementations, the different individual geolocation estimates and the geolocation input data associated with the different individual geolocation estimates and/or to different sets of geolocation estimates and the geolocation input data associated with the different sets of geolocation estimates may relate to different entities (e.g. basestations, sensors, measurement devices, and/or the like), different localities, and/or different types of terrain (e.g., urban, suburban, rural, indoors, outdoors, and/or the like).

Alternatively, and/or additionally, the different individual geolocation estimates and the geolocation input data associated with the different individual geolocation estimates and/or the different sets of geolocation estimates and the geolocation input data associated with the different sets of geolocation estimates may relate to repeated executions of the geolocation estimation model under different conditions, which produce alternate geolocation estimates for presentation to the quality evaluator function. These repeated executions may significantly increase the number of opportunities for the quality evaluator model to provide training feedback to the geolocation estimation model and therefore may achieve a higher quality (e.g., increased accuracy) of the geolocation estimation model in a shorter time-frame.

In some implementations, the geolocation system repeatedly generates geolocation estimates for quality evaluation of a geolocation estimation model based on sub-populating the geolocation input data in different ways. The geolocation system may sub-populate the geolocation input data by removing data from the geolocation input data. For example, the geolocation system may remove all attributes of a particular type, randomly remove attributes, systematically explore all sub-populated attribute combinations, utilize combinations of attributes for which performance of the geolocation estimation model has a current weakness relative to other combinations of attributes, and/or the like. The geolocation system may utilize one or more quality evaluator models to evaluate a quality of the geolocation estimation model, as described herein.

Figure 1D:
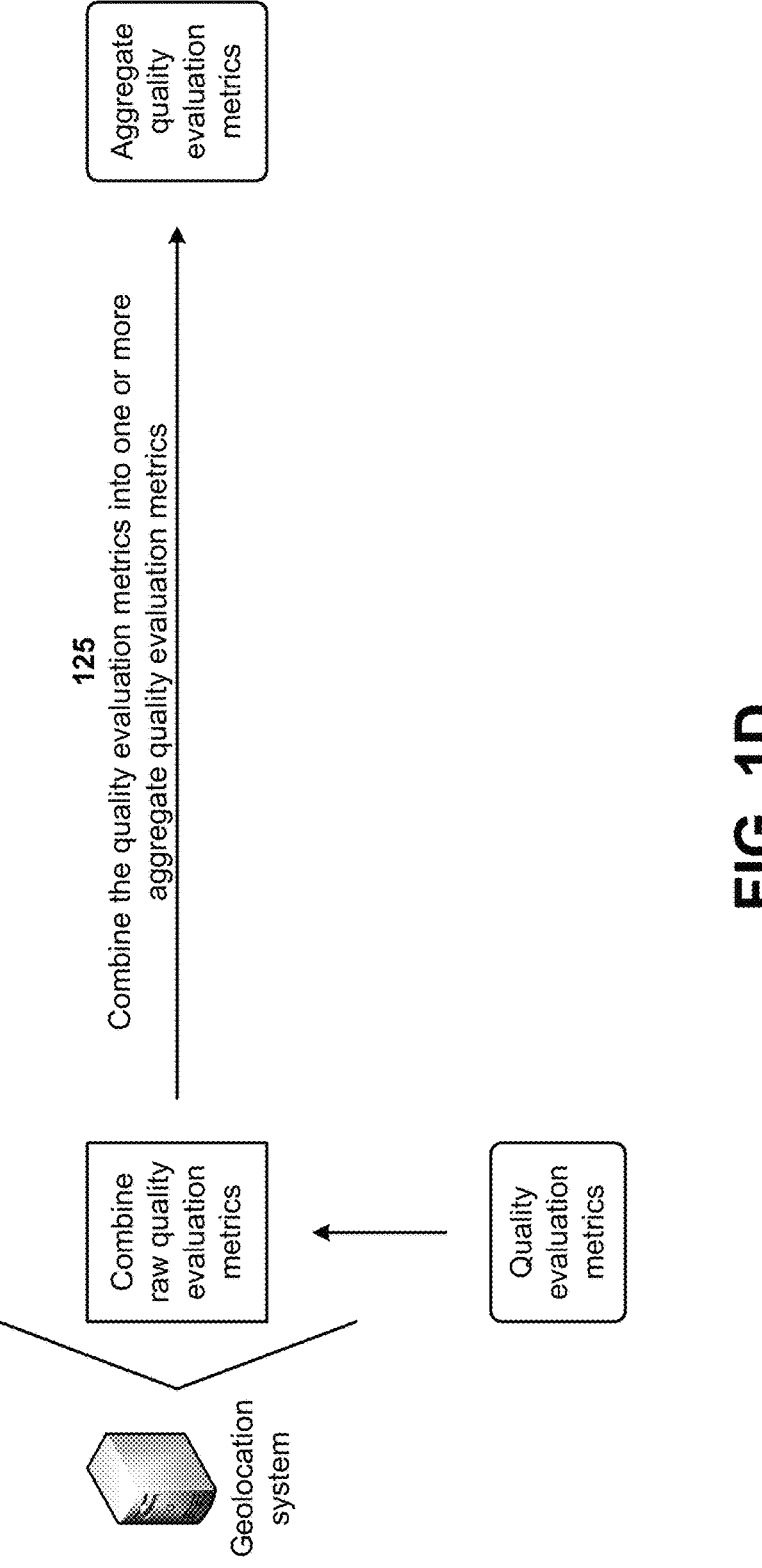

In some implementations, as shown in FIG. 1D, and by reference number 125, the geolocation system combines the raw quality evaluation metrics into one or more aggregate quality evaluation metrics. The geolocation system may combine multiple raw quality evaluation metrics generated by one or more quality evaluator model to generate an aggregate quality evaluation metric. For example, the geolocation system may generate the aggregate quality evaluation metric based on an average of the multiple raw quality evaluation metrics, a summation of the multiple raw quality evaluation metrics, a weighted summation of the multiple raw quality evaluation metrics, multiplication of the multiple raw quality evaluation metrics, a reduction of the multiple raw quality evaluation metrics to an extreme value, and/or the like. In some implementations, the geolocation system may not generate the aggregate quality evaluation metrics and may modify the geolocation estimation model (as described below) based on the raw quality evaluation metrics.

Figure 1E:
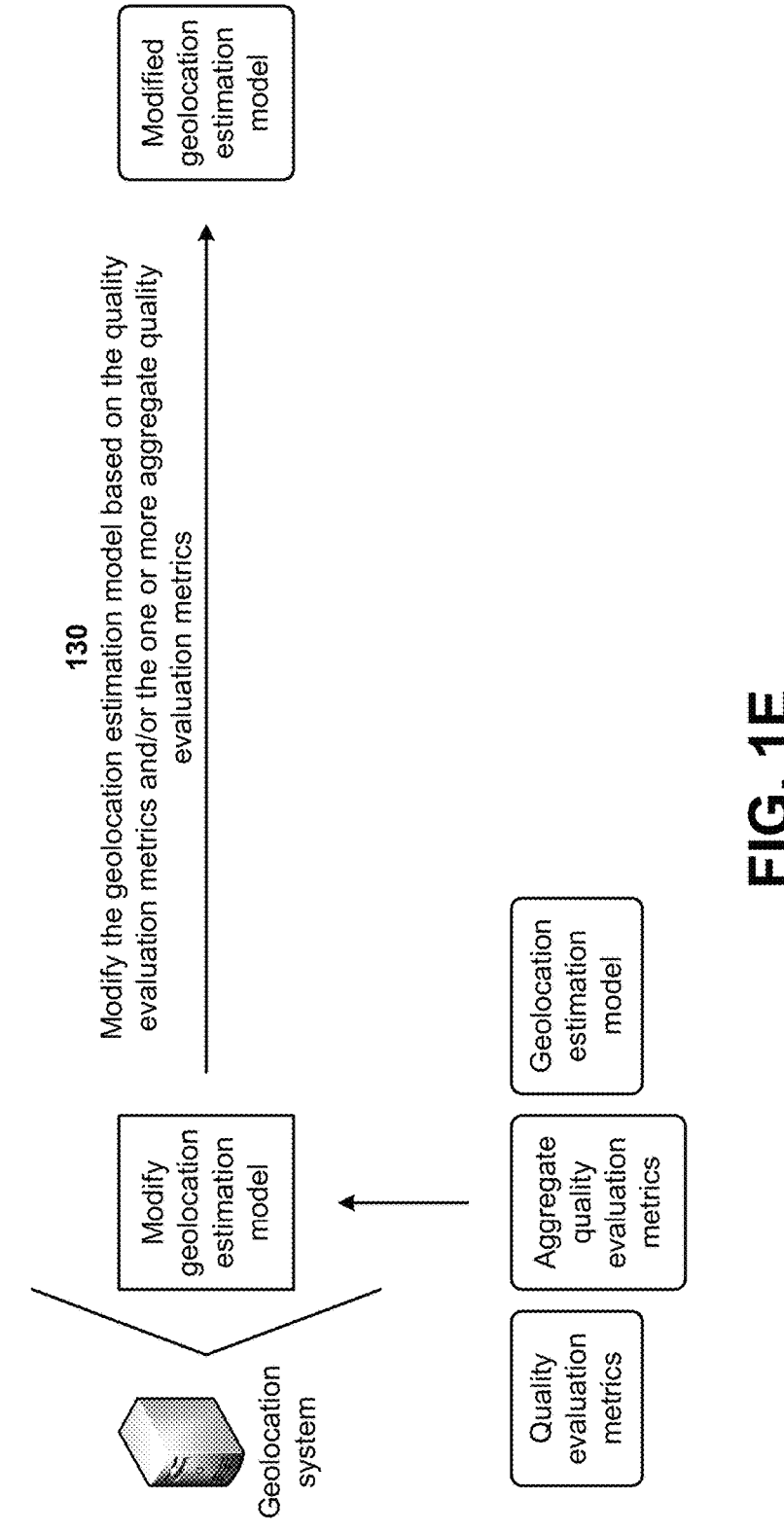

As shown in FIG. 1E, and by reference number 130, the geolocation system modifies the geolocation estimation model based on the one or more raw quality evaluation metrics and/or the one or more aggregate quality evaluation metrics. In some implementations, the geolocation system may use one or more of the raw quality evaluation metrics and/or one or more aggregate quality evaluation metrics to identify one or more examples of geolocation estimates that have poor quality by virtue of being assigned a less favorable raw quality evaluation metric and/or a less favorable aggregate quality evaluation metric. The geolocation system may modify the geolocation estimation model and/or one or more parameters of the geolocation estimation model based on the geolocation estimates that produced less favorable raw quality evaluation metrics, the aggregate quality evaluation metrics that produced less favorable aggregate quality evaluation metrics, and/or based on the geolocation input data input to the quality evaluator function associated with the geolocation estimates.

In some implementations, the geolocation system may modify one or more parameters of the geolocation estimation model based on the one or more raw quality evaluation metrics and/or the one or more aggregate quality evaluation metrics. The geolocation system may utilize one or more raw quality evaluation metrics and/or one or more aggregate quality evaluation metrics, separately or in aggregate, to construct an objective function, to guide an algorithm designed to improve an objective function (e.g., random search, greedy search, simulated annealing, evolutionary algorithm, hyper-heuristic algorithm, particle swarm, back-propagation, and/or the like) configured to select a better set of parameters for the geolocation estimation model.

In some implementations, the geolocation system trains one or more learning algorithms for implementing a geolocation estimation model based on the one or more raw quality evaluation metrics and/or the one or more aggregate quality evaluation metrics. The geolocation system may utilize one or more raw quality evaluation metrics and/or one or more aggregate quality evaluation metrics, separately or in aggregate, to provide feedback to the one or more learning algorithm (e.g., reinforcement learning algorithm, agent-based learning algorithm, Markov decision process, and/or the like) to promote strategies that achieve better quality evaluation metrics and/or to avoid strategies that achieve inferior quality evaluation metrics.

As described above, if a geolocation estimation model produces geolocation estimates that are less consistent, less plausible, and/or less visually convincing, a less favorable quality evaluation metric may be determined. However, in some cases an error in the geolocation input data may cause a geolocation estimator model to produce geolocation estimates that give rise to less favorable quality evaluation metrics. Moreover, errors in the inputs to the quality evaluator function other than the geolocation estimates themselves can also give rise to less favorable quality evaluation metrics. In some implementations, the geolocation system may utilize poor quality evaluation metrics (e.g., quality evaluation metrics failing to satisfy a threshold) to detect errors in the one or more sets of geolocation input data used as inputs to the geolocation estimation model. For example, the locations of infrastructure such as base stations, beacons and/or the like whose measurements are employed to estimate locations of entities may be recorded erroneously. A less favorable quality evaluation metric may be used to trigger an alarm and/or other signal indicative of the fact that investigation is recommended of the one or more sets of geolocation input data.

In some implementations, a less favorable quality evaluation metric may also be used to trigger an automated response where modified values of one or more of measurements, observations, and/or configurations that are potentially in error are used as alternate inputs to the geolocation estimation model and the effect on the quality evaluation metrics measured. Where the quality evaluation metrics are found to become more favorable, the geolocation system may determine that the quality evaluation metrics are indicative of the modified values being closer to the correct value. By iterative application of this process more accurate values of the parameters may be found. In some implementations, the geolocation system may utilize one or more search algorithms to support the application of the process. For example, the geolocation system may utilize a random search algorithm, a greedy search algorithm, simulated annealing, an evolutionary algorithm, a hyper-heuristic algorithm, a particle swarm algorithm and/or back-propagation, among other examples.

In some implementations, one of the locations, characteristics, and/or configurations of an entity and/or infrastructure are unknown and the geolocation system may use one or more quality evaluation metrics to estimate the unknown data. In some implementations, the geolocation system may estimate or arbitrarily select initial values for the unknown data. For example, the geolocation system may estimate or arbitrary select initial values for the unknown data based on performing a random sampling from a distribution, using default values, by computing the mean, mode, median and/or centroid of known instances of the unknown data and/or based on historical values of the unknown data, among other examples. Once the unknown data are thus initialized, the method for correcting erroneous values described above may proceed to find improved estimates for the unknown data.

In some implementations, one or more quality evaluation metrics may be used to estimate dynamic, unknown data. For example, a location, characteristic, measurement, observation, and/or configuration of infrastructure included in the one or more sets of geolocation input data input to a geolocation estimation model may be dynamic and change in a way that is unknown and the geolocation system may utilize one or more quality evaluation metrics to estimate the dynamics of the unknown data. For example, in the case of an unknown location, the geolocation system may determine the unknown data based on a series of discrete times where the location can be estimated for each time step as described for a static value above. Alternatively, and/or additionally, the derived trajectory may be iteratively processed by one or more quality evaluator functions and the trajectory that best satisfies the one or more quality evaluator functions may be determined to be most likely as corresponding to the unknown data.

In some implementations the geolocation system may perform a multiplicity of modifying a geolocation estimation model, modifying one or more parameters of a geolocation estimation model, detecting errors in one or more sets of geolocation input data, finding more accurate values for parameters, and/or estimating unknown locations, characteristics, and/or configurations of an entity and/or infrastructure simultaneously.

As shown in FIG. 1F, and by reference number 135, the geolocation system performs one or more actions based on one or more raw quality evaluation metrics and/or one or more aggregate quality evaluation metrics. In some implementations, the one or more actions include the geolocation system providing one or more raw quality evaluation metrics and/or one or more aggregate quality evaluation metrics for display. For example, the geolocation system may provide one or more aggregate quality evaluation metrics and/or one or more raw quality evaluation metrics for display to a user via a user interface provided by a client device.

In some implementations, the one or more actions include the geolocation system modifying the geolocation estimation model based on one or more raw quality evaluation metrics and/or one or more aggregate quality evaluation metrics and causing the modified geolocation estimation model to be implemented. For example, the geolocation system may modify the geolocation estimation model in a manner similar to that described above and may cause the modified geolocation estimation model to be implemented in a network based on modifying the geolocation evaluation model.

In some implementations, the one or more actions include the geolocation system modifying one or more parameters of the geolocation estimation model based on one or more raw quality evaluation metrics and/or one or more aggregate quality evaluation metrics. For example, the geolocation system may modify one or more parameters of the geolocation estimation model based on one or more raw quality evaluation metrics and/or one or more aggregate quality evaluation metrics in a manner similar to that described above. In some implementations, the one or more actions include the geolocation system receiving feedback associated with the one or more raw quality evaluation metrics and/or the one or more aggregate quality evaluation metrics and modifying the one or more quality evaluator models based on the feedback.

In some implementations, the one or more actions include the geolocation system training one or more learning algorithms for implementing a geolocation estimation model based on the one or more raw quality evaluation metrics and/or the one or more aggregate quality evaluation metrics. In some implementations, the the geolocation system may train the one or more learning algorithms for implementing a geolocation estimation model based on the one or more raw quality evaluation metrics and/or the one or more aggregate quality evaluation metrics in a manner similar to that described above.

In some implementations, the one or more actions include the geolocation system utilizing poor quality evaluation metrics (e.g., quality evaluation metrics failing to satisfy a threshold) to detect errors in the one or more sets of geolocation input data used as inputs to the geolocation estimation model. In some implementations, the the geolocation system may utilize poor quality evaluation metrics (e.g., quality evaluation metrics failing to satisfy a threshold) to detect errors in the one or more sets of geolocation input data used as inputs to the geolocation estimation model in a manner similar to that described above.

In some implementations, the one or more actions include the geolocation system utilizing a less favorable quality evaluation metric to trigger an automated response where modified values of one or more of measurements, observations, and/or configurations that are potentially in error are used as alternate inputs to the geolocation estimation model and the effect on the quality evaluation metrics measured. In some implementations, the the geolocation system may utilize a less favorable quality evaluation metric to trigger an automated response where modified values of one or more of measurements, observations, and/or configurations that are potentially in error are used as alternate inputs to the geolocation estimation model and the effect on the quality evaluation metrics measured in a manner similar to that described above.

In some implementations, the one or more actions include the geolocation system utilizing one or more quality evaluation metrics to estimate unknown data. For example, one of the locations, characteristics, and/or configurations of an entity and/or infrastructure are unknown and the geolocation system may use one or more quality evaluation metrics to estimate the unknown data. In some implementations, the the geolocation system may utilize one or more quality evaluation metrics to estimate unknown data in a manner similar to that described above.

In some implementations, the one or more actions include the geolocation system utilizing one or more quality evaluation metrics to estimate dynamic, unknown data. For example, a location, characteristic, measurement, observation, and/or configuration of infrastructure included in the one or more sets of geolocation input data input to a geolocation estimation model may be dynamic and change in a way that is unknown and the geolocation system may utilize one or more quality evaluation metrics to estimate the dynamics of the unknown data. In some implementations, the the geolocation system may utilize one or more quality evaluation metrics to estimate dynamic, unknown data in a manner similar to that described above.

In some implementations, the one or more actions include the geolocation estimation model performing a multiplicity of modifying a geolocation estimation model, modifying one or more parameters of a geolocation estimation model, detecting errors in one or more sets of geolocation input data, finding more accurate values for parameters, and/or estimating unknown locations characteristics, and/or configurations of an entity and/or infrastructure simultaneously.

In some implementations, the one or more actions include the geolocation system training and/or retraining the one or more quality evaluator models based on one or more raw quality evaluation metrics and/or one or more aggregate quality evaluation metrics. The geolocation system may utilize the one or more raw quality evaluation metrics and/or the one or more aggregate quality evaluation metrics as additional training data for retraining the one or more quality evaluator models, thereby increasing the quantity of training data available for training the one or more quality evaluator models. Accordingly, the geolocation system may conserve computing resources associated with identifying, obtaining, and/or generating historical data for training the one or more quality evaluator models relative to other systems for identifying, obtaining, and/or generating historical data for training machine learning models.

In this way, the geolocation system utilizes models to evaluate geolocation estimate quality of a geolocation estimation model without independent test data. The geolocation system may select quality evaluator models and may select geolocation input data for each of the quality evaluator models. The geolocation system may process the geolocation input data, with the geolocation estimates generated by the geolocation estimation model and the quality evaluator models, to generate raw quality evaluation metrics. The geolocation system may combine multiplicities of the raw quality evaluation metrics into one or more aggregate quality evaluation metrics, and may utilize one or more of the raw quality evaluation metrics and/or one or more of the aggregate quality evaluation metrics to modify the geolocation estimation model, to modify the parameters of the geolocation estimation model, to modify geolocation input data and/or to estimate geolocation input data. This, in turn, conserves computing resources, networking resources, human resources, and/or the like that would otherwise have been wasted in generating an inaccurate geolocation estimation model, generating inaccurate geolocation estimates with the inaccurate geolocation estimation model, providing the inaccurate geolocation estimates to applications, dealing with the consequences of the erroneous outputs of the applications resulting from inaccurate geolocation estimates used as inputs to the applications, handling customer complaints associated with the applications, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
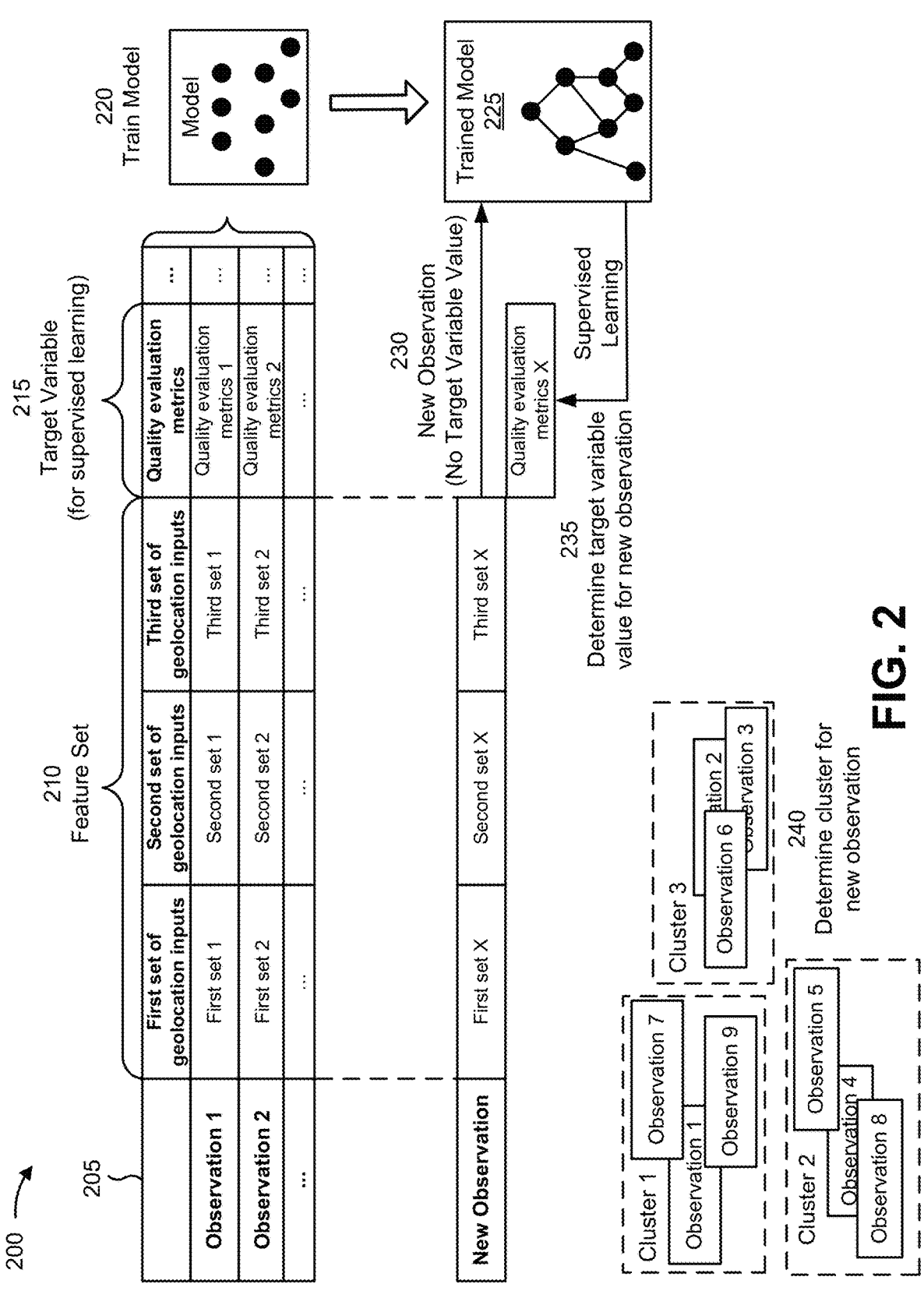
FIG. 2 is a diagram illustrating an example of training and using a model in connection with evaluating geolocation estimate quality without independent test data.

FIG. 2 is a diagram illustrating an example 200 of training and using a machine learning model (e.g., the one or more quality evaluator models or the geolocation estimation model) in connection with evaluating geolocation estimate quality without independent test data. The machine learning model training and usage described herein may be performed using a machine learning system. The machine learning system may include or may be included in a computing device, a server, a cloud computing environment, and/or the like, such as the geolocation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the geolocation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the geolocation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a first set of geolocation inputs, a second feature of a second set of geolocation inputs, a third feature of a third set of geolocation inputs, and so on. As shown, for a first observation, the first feature may have a value of first set 1, the second feature may have a value of second set 1, the third feature may have a value of third set 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is raw quality evaluation metrics, which has a value of quality evaluation metrics 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first set X, a second feature of second set X, a third feature of third set X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of quality evaluation metrics X for the target variable of raw quality evaluation metrics for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first set of geolocation inputs cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second set of geolocation inputs cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

As indicated above, FIG. 2 is provided as an example. Other examples may differ from what is described in connection with FIG. 2.

Figure 3:
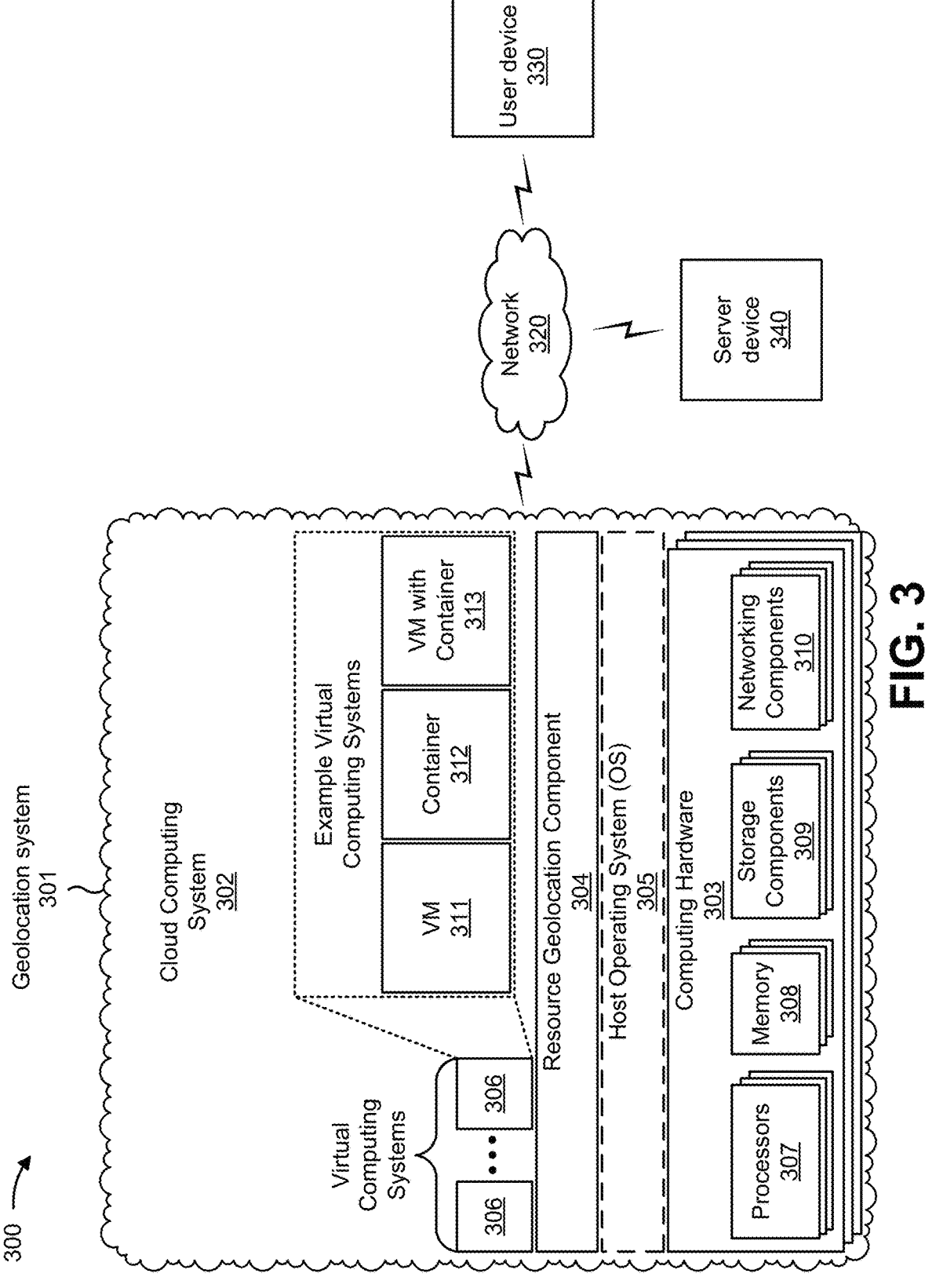
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a geolocation system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the geolocation system 301 may include one or more elements 303-313 of the cloud computing system 302, may execute within the cloud computing system 302, and/or may be hosted within the cloud computing system 302, in some implementations, the geolocation system 301 may not be cloud-based (e.g., may be implemented outside of a cloud computing system) or may be partially cloud-based. For example, the geolocation system 301 may include one or more devices that are not part of the cloud computing system 302, such as device 400 of FIG. 4, which may include a standalone server or another type of computing device. The geolocation system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information, as described elsewhere herein.

Server device 340 may include a communication device and/or a computing device. For example, server device 340 may include a server, such as an application server, a client server, a web server, a database server, a host server, a proxy server, a virtual server (e.g., executing on computing hardware), or a server in a cloud computing system. In some implementations, server device 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
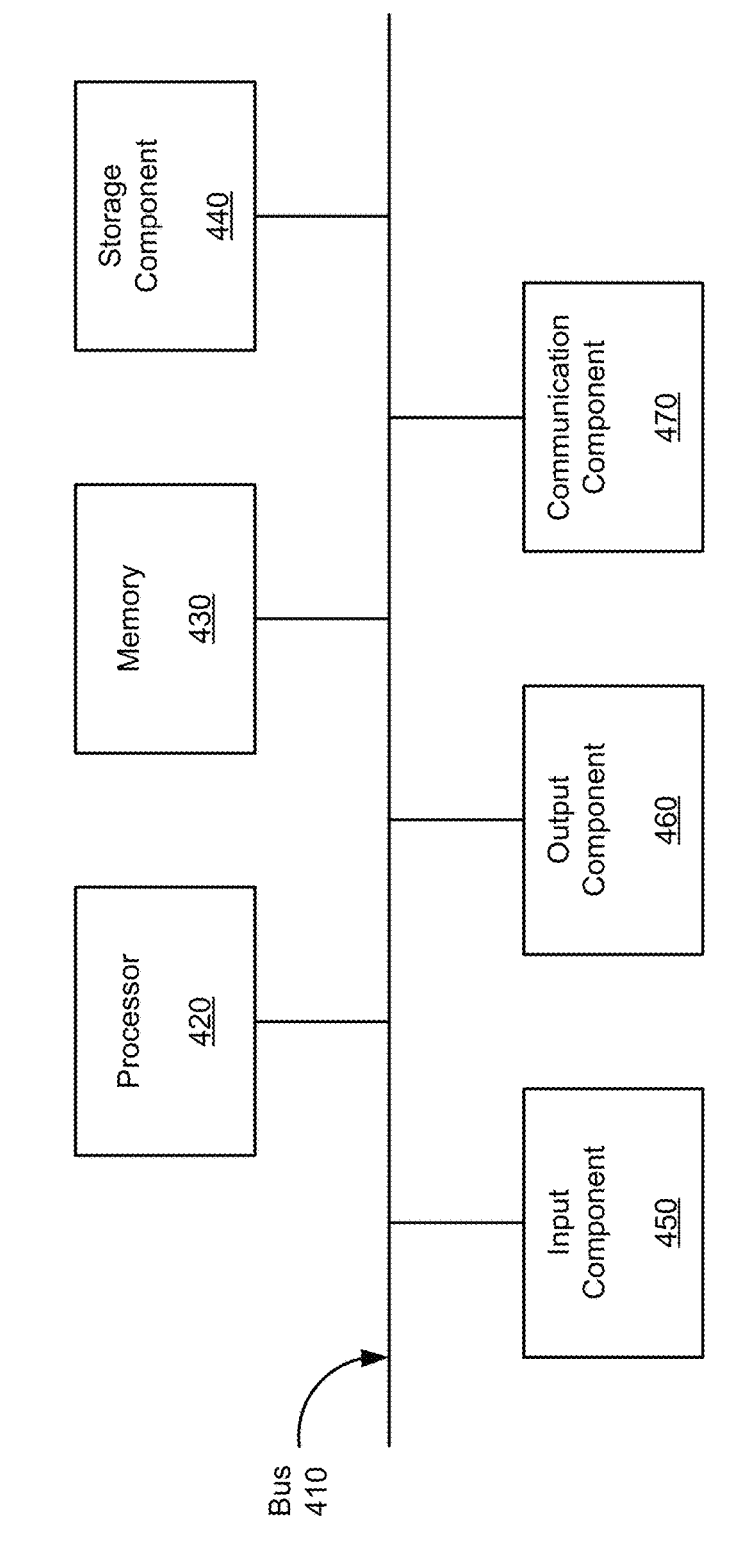
FIG. 4 is a diagram of example components of one or more devices of FIG. 3.

FIG. 4 is a diagram of example components of a device 400, which may correspond to geolocation system 301, user device 330, and/or server device 340. In some implementations, geolocation system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440)

may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing models to evaluate geolocation estimate quality without independent test data. In some implementations, one or more process blocks of FIG. 5 may be performed by a device (e.g., geolocation system 301). In some implementations, one or more process blocks of FIG. 5 may be performed by another device or a group of devices separate from or including the device, such as a user device (e.g., user device 330) and/or a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving a geolocation estimation model and geolocation input data identifying geolocations (block 510). For example, the device may receive a geolocation estimation model and geolocation input data identifying geolocations, as described above. The geolocation input data may include measurements associated with the geolocations, observations associated with the geolocations, configuration values associated with the geolocations, and/or the like.

As further shown in FIG. 5, process 500 may include selecting one or more quality evaluator models from a plurality of quality evaluator models (block 520). For example, the device may select one or more quality evaluator models from a plurality of quality evaluator models, as described above.

As further shown in FIG. 5, process 500 may include determining a set of the geolocation input data, for each of the one or more quality evaluator models, to generate sets of the geolocation input data (block 530). For example, the device may determine a set of the geolocation input data, for each of the one or more quality evaluator models, to generate sets of the geolocation input data, as described above.

As further shown in FIG. 5, process 500 may include processing the sets of the geolocation input data, with corresponding ones of the one or more quality evaluator models, to generate quality evaluation metrics (block 540). For example, the device may process the sets of the geolocation input data, with corresponding ones of the one or more quality evaluator models, to generate quality evaluation metrics, as described above. Each of the quality evaluation metrics may include a metric identifying a degree to which one or more geolocation estimates are consistent with other geolocation estimates, a metric identifying a consistency with data used as input to the geolocation estimation model, a metric identifying a consistency with other associated data, a metric identifying likelihoods of the one or more geolocation estimates, a metric identifying sequences of the one or more geolocation estimates, and/or a metric identifying a degree to which distributions of locations are visually convincing.

In some implementations, when processing the sets of the geolocation input data, the device may calculate first estimates of locations of a first entity during a first time period and based on a first set of one or more measurements performed by the first entity during the first time period. The device may calculate second estimates of locations of a second entity during a second time period and based on a second set of one or more measurements performed by the second entity during the second time period. The device may generate the quality evaluation metrics based on the first estimates and the second estimates.

In some implementations, the device may calculate estimates of locations of the first entity during the first time period and based on a set of one or more measurements associated with relative positions of the first entity during the first time period and of the second entity during the second time period or based on information identifying the relative positions. The device may generate the quality evaluation metrics based on the estimates.

Alternatively, and/or additionally, the device may calculate first estimates of locations of a first entity during a first time period and based on a first sequence of sets of one or more measurements performed by the first entity during the first time period. The device may calculate a sequence of second estimates of locations of a second entity during a second time period and based on a second sequence of sets of one or more measurements performed by the second entity during the second time period. The device may generate the quality evaluation metrics based on the first estimates and the sequence of the second estimates.

In some implementations, the device may determine a first time associated with reception of a first signal transmitted by a first transmitting device. The device may determine a second time associated with reception of a second signal transmitted by a second transmitting device. The device may calculate a difference between the first time and the second time and may generate one of the quality evaluation metrics based on the difference. Alternatively, and/or additionally, the device may identify a classification of a state class for an entity and may generate one of the quality evaluation metrics based on the classification.

In some implementations, the device may estimate a geolocation for an entity. The device may determine a first likelihood that the entity is located at the estimated geolocation. The device may generate one of the quality evaluation metrics based on the first likelihood. Alternatively, and/or additionally, the device may identify a sequence of estimates of a location of an entity as the location changes over time. The device may determine a second likelihood that the entity followed a trajectory corresponding to the sequence of estimates of location. The device may generate one of the quality evaluation metrics based on the second likelihood.

As further shown in FIG. 5, in some implementations process 500 may include combining the quality evaluation metrics into one or more aggregate quality evaluation metrics (block 550). For example, the device may combine the quality evaluation metrics into one or more aggregate quality evaluation metrics, as described above.

As further shown in FIG. 5, process 500 may include modifying the geolocation estimation model based on the one or more quality evaluation metrics and/or the one or more aggregate quality evaluation metrics (block 560). For example, the device may modify the geolocation estimation model based on the one or more quality evaluation metrics and/or the one or more aggregate quality evaluation metrics, as described above.

As further shown in FIG. 5, process 500 may include performing one or more actions based on the one or more quality evaluation metrics and/or the one or more aggregate quality evaluation metrics (block 570). For example, the device may perform one or more actions based on the one or more quality evaluation metrics and/or the one or more aggregate quality evaluation metrics, as described above. In some implementations, performing the one or more actions may include the device providing the one or more quality evaluation metrics and/or the one or more aggregate quality evaluation metrics for display; training and/or retraining the one or more quality evaluator models based on the one or more quality evaluation metrics and/or the one or more aggregate quality evaluation metrics; modifying the geolocation estimation model based on the one or more quality evaluation metrics and/or the one or more aggregate quality evaluation metrics and causing the modified geolocation estimation model to be implemented; modifying one or more parameters of the geolocation estimation model based on the one or more quality evaluation metrics and/or the one or more aggregate quality evaluation metrics and causing the modified parameters of the geolocation estimation model to be implemented; training and/or retraining one or more learning algorithms for implementing a geolocation estimation model based on the one or more quality evaluation metrics and/or the one or more aggregate quality evaluation metrics and causing the modified learning algorithm to be implemented in the geolocation estimation model; detecting errors in the geolocation input data based on the one or more quality evaluation metrics and/or the one or more aggregate quality evaluation metrics; finding more accurate values for geolocation input data based on the one or more quality evaluation metrics and/or the one or more aggregate quality evaluation metrics; finding values for unknown geolocation input data based on the one or more quality evaluation metrics and/or the one or more aggregate quality evaluation metrics; estimating dynamic unknown values for geolocation input data based on the one or more quality evaluation metrics and/or the one or more aggregate quality evaluation metrics; modifying the one or more quality evaluator models based on the one or more quality evaluation metrics and/or the one or more aggregate quality evaluation metrics; and/or receiving feedback associated with the one or more quality evaluation metrics and/or the one or more aggregate quality evaluation metrics and modifying the one or more quality evaluator models based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, geolocation input data identifying one or more geolocations and a machine learning model configured to generate one or more geolocation estimates,
wherein the geolocation input data includes one or more measured quantities associated with one or more of a channel quality indicator, a reference signal code power (RSCP), a received power level (RxLev), an $E_c/N_0$ measurement, a frequency, a center frequency, a spectral power distribution, a phase, a phase shift, an angle of arrival, a time of signal arrival, or a time difference of arrival with respect to another signal;
removing, by the device, data from the geolocation input data to generate sub-populated geolocation input data, wherein removing the data from the geolocation input data comprises one or more of:
removing all attributes of a particular type,
randomly removing attributes,
systematically exploring all sub-populated attribute combinations, or
utilizing combinations of attributes for which performance of the machine learning model has a current weakness relative to other combinations of attributes;
generating, by the device and using the machine learning model, the one or more geolocation estimates based on the sub-populated geolocation input data;
generating, by the device, a plurality of quality evaluation metrics based on the one or more geolocation estimates,
wherein the plurality of quality evaluation metrics includes one or more of:
a metric identifying a degree to which the one or more geolocation estimates are consistent with other geolocation estimates, or
a metric identifying a degree to which the one or more geolocation estimates are consistent with the geolocation input data;
combining, by the device, the plurality of quality evaluation metrics to generate one or more aggregate quality evaluation metrics,
wherein combining the plurality of quality evaluation metrics comprises one or more of:
averaging the plurality of quality evaluation metrics,
performing a summation the plurality of quality evaluation metrics,
performing a weighted summation of the plurality of quality evaluation metrics,
performing a multiplication of the plurality of quality evaluation metrics, or
performing a reduction of the plurality of quality evaluation metrics to an extreme value; and
causing, by the device and to improve an accuracy of geolocation estimates generated by the machine learning model, a modification of the machine learning model to be implemented in a network,
wherein the modification is performed by constructing an objective function based on the one or more aggregate quality evaluation metrics.

2. The method of claim 1, wherein the geolocation input data further includes one or more of:
observations associated with the geolocations, or
configuration values associated with the geolocations.

3. The method of claim 1, wherein the one or more geolocation estimates include:
first estimates of locations, of a first entity during a first time period, based on a first set of one or more measurements performed by the first entity during the first time period, and
second estimates of locations, of a second entity during a second time period, based on a second set of one or more measurements performed by the second entity during the second time period, and
wherein generating the plurality of quality evaluation metrics comprises:
generating the plurality of quality evaluation metrics based on the first estimates and the second estimates.

4. The method of claim 1, wherein the one or more geolocation estimates include:
a sequence of first estimates of locations, of a first entity during a first time period, based on a first sequence of sets of one or more measurements performed by the first entity during the first time period, and a sequence of second estimates of locations, of a second entity during a second time period, based on a second sequence of sets of one or more measurements performed by the second entity during the second time period, and wherein generating the plurality of quality evaluation metrics comprises:

generating the plurality of quality evaluation metrics based on the sequence of first estimates and the sequence of the second estimates.

5. The method of claim 1, wherein the one or more geolocation estimates include:

estimates of locations, of a first entity during a first time period, based on:

a set of one or more measurements associated with relative positions of the first entity during the first time period and of a second entity during a second time period, or information identifying the relative positions, and wherein generating the plurality of quality evaluation metrics comprises:

generating the plurality of quality evaluation metrics based on the estimates.

6. The method of claim 1, wherein generating the plurality of quality evaluation metrics comprises:

determining a first time associated with reception of a first signal transmitted by a first transmitting device;

determining a second time associated with reception of a second signal transmitted by a second transmitting device;

calculating a difference between the first time and the second time; and generating one of the plurality of quality evaluation metrics based on the difference.

7. A device, comprising:

one or more processors configured to:

receive geolocation input data identifying one or more geolocations and a machine learning model configured to generate one or more geolocation estimates, wherein the geolocation input data includes one or more measured quantities associated with one or more of a channel quality indicator, a reference signal code power (RSCP), a received power level (RxLev), an $E_c/N_0$ measurement, a frequency, a center frequency, a spectral power distribution, a phase, a phase shift, an angle of arrival, a time of signal arrival, or a time difference of arrival with respect to another signal;

remove data from the geolocation input data to generate sub-populated geolocation input data, wherein the one or more processors, to remove the data from the geolocation input data, are configured to one or more of:

remove all attributes of a particular type, randomly remove attributes, systematically explore all sub-populated attribute combinations, or utilize combinations of attributes for which performance of the machine learning model has a current weakness relative to other combinations of attributes;

generate, using the machine learning model, the one or more geolocation estimates based on the sub-populated geolocation input data;

generate a plurality of quality evaluation metrics based on the one or more geolocation estimates, wherein the plurality of quality evaluation metrics includes one or more of:

a metric identifying a degree to which the one or more geolocation estimates are consistent with other geolocation estimates, or a metric identifying a degree to which the one or more geolocation estimates are consistent with the geolocation input data, combine the plurality of quality evaluation metrics to generate one or more aggregate quality evaluation metrics, wherein the one or more processors, to combine the plurality of quality evaluation metrics, are configured to one or more of:

average the plurality of quality evaluation metrics, perform a summation the plurality of quality evaluation metrics, perform a weighted summation of the plurality of quality evaluation metrics, perform a multiplication of the plurality of quality evaluation metrics, or perform a reduction of the plurality of quality evaluation metrics to an extreme value; and cause, to improve an accuracy of geolocation estimates generated by the machine learning model, a modification of the machine learning model to be implemented in a network, wherein the modification is performed by constructing an objective function based on the one or more aggregate quality evaluation metrics.

8. The device of claim 7, wherein the one or more processors, to generate the plurality of quality evaluation metrics, are configured to:

determine a likelihood that an entity is located at an estimated geolocation of the one or more geolocation estimates; and generate one of the plurality of quality evaluation metrics based on the likelihood.

9. The device of claim 7, wherein the one or more processors, to generate the plurality of quality evaluation metrics, are configured to:

identify a sequence of estimates of a location of an entity as the location changes over time; and generate one of the plurality of quality evaluation metrics based on the sequence of estimates.

10. The device of claim 7, wherein the one or more processors, to generate the plurality of quality evaluation metrics, are configured to:

identify a classification of a state class for an entity; and generate one of the plurality of quality evaluation metrics based on the classification.

11. The device of claim 7, wherein the one or more processors are configured to one or more of:

provide the plurality of quality evaluation metrics for display; or retrain a different machine learning model, configured to generate the plurality of quality evaluation metrics, based on the plurality of quality evaluation metrics.

12. The device of claim 7, wherein the one or more processors are further configured to one or more of:

modify one or more parameters of the machine learning model based on the plurality of quality evaluation metrics; or correct an error in the geolocation input data based on the plurality of quality evaluation metrics.

13. The device of claim 7, wherein the one or more processors are further configured to one or more of:

modify, based on the plurality of quality evaluation metrics, a different machine learning model used to generate the plurality of quality evaluation metrics; or receive feedback associated with the plurality of quality evaluation metrics and modify the different machine learning model based on the feedback.

14. A non-transitory computer-readable medium storing a set of instructions, the set of instructions comprising:

one or more instructions that, when executed by one or more processors of a device, cause the device to:

receive geolocation input data identifying one or more geolocations and a machine learning model configured to generate one or more geolocation estimates, wherein the geolocation input data includes one or more measured quantities associated with one or more of a channel quality indicator, a reference signal code power (RSCP), a received power level (RxLev), an $E_c/N_0$ measurement, a frequency, a center frequency, a spectral power distribution, a phase, a phase shift, an angle of arrival, a time of signal arrival, or a time difference of arrival with respect to another signal;

remove data from the geolocation input data to generate sub-populated geolocation input data, wherein the one or more instruction, to cause the device to remove the data from the geolocation input data, cause the device to one or more of:

remove all attributes of a particular type, randomly remove attributes, systematically explore all sub-populated attribute combinations, or utilize combinations of attributes for which performance of the machine learning model has a current weakness relative to other combinations of attributes;

generate, using the machine learning model, the one or more geolocation estimates based on the sub-populated geolocation input data;

generate a plurality of quality evaluation metrics based on the one or more geolocation estimates, wherein the plurality of quality evaluation metrics includes one or more of:

a metric identifying a degree to which the one or more geolocation estimates are consistent with other geolocation estimates, or a metric identifying a degree to which the one or more geolocation estimates are consistent with the geolocation input data, combine the plurality of quality evaluation metrics to generate one or more aggregate quality evaluation metrics, wherein the one or more instructions, to cause the device to combine the plurality of quality evaluation metrics, cause the device to one or more of:

average the plurality of quality evaluation metrics, perform a summation the plurality of quality evaluation metrics, perform a weighted summation of the plurality of quality evaluation metrics, perform a multiplication of the plurality of quality evaluation metrics, or perform a reduction of the plurality of quality evaluation metrics to an extreme value; and cause, to improve an accuracy of geolocation estimates generated by the machine learning model, a modification of the machine learning model, or one or more parameters of the machine learning model, to be implemented in a network, wherein the modification is performed by constructing an objective function based on the one or more aggregate quality evaluation metrics.

15. The non-transitory computer-readable medium of claim 14, wherein the geolocation estimates include:

first estimates of locations, of a first entity during a first time period, based on a first set of one or more measurements performed by the first entity during the first time period, and second estimates of locations, of a second entity during a second time period, based on a second set of one or more measurements performed by the second entity during the second time period; or a sequence of the first estimates of locations based on a first sequence of sets of the one or more measurements performed by the first entity during the first time period, and a sequence of the second estimates of locations based on a second sequence of sets of the one or more measurements performed by the second entity during the second time period.

16. The non-transitory computer-readable medium of claim 14, wherein the geolocation estimates include:

estimates of locations, of a first entity during a first time period, based on:

a set of one or more measurements associated with relative positions of the first entity during the first time period and a second entity during a second time period, or information identifying the relative positions.

17. The non-transitory computer-readable medium of claim 14, wherein the one or more instructions, that cause the device to generate the plurality of quality evaluation metrics, cause the device to:

determine a first time associated with reception of a first signal transmitted by a first transmitting device;

determine a second time associated with reception of a second signal transmitted by a second transmitting device;

calculate a difference between the first time and the second time; and generate one of the plurality of quality evaluation metrics based on the difference.

18. The non-transitory computer-readable medium of claim 14, wherein the one or more instructions further cause the device to one or more of:

provide the plurality of quality evaluation metrics for display;

retrain one or more other machine learning models based on the plurality of quality evaluation metrics;

modify the one or more other machine learning models based on the plurality of quality evaluation metrics; or receive feedback associated with the plurality of quality evaluation metrics and modify the one or more other machine learning models based on the feedback.

19. The method of claim 1, wherein the one or more measured quantities are associated with one or more of a signal strength, a signal quality, a signal-to-noise ratio, a reference signal received power (RSRP), a reference signal received quality (RSRQ), a received signal strength indicator (RSSI), or a signal-to-interference-plus-noise ratio (SINR).

20. The method of claim 1, wherein generating the plurality of quality evaluation metrics comprises:

identifying a sequence of estimates of a location of an
entity as the location changes over time; and
generating one of the plurality of quality evaluation
metrics based on the sequence of estimates.

* * * * *